United States Patent

Umemoto et al.

[11] Patent Number: 5,573,868
[45] Date of Patent: Nov. 12, 1996

[54] MATERIAL FOR GENERATING ELECTRIC ENERGY

[75] Inventors: Teruo Umemoto, Tsukuba; Naoaki Izutani, Takatsuki; Ikuko Takahasi, Tsukuba, all of Japan

[73] Assignee: Daikin Industries, Ltd., Osaka, Japan

[21] Appl. No.: 356,245

[22] PCT Filed: Apr. 20, 1994

[86] PCT No.: PCT/JP94/00656

§ 371 Date: Mar. 22, 1995

§ 102(e) Date: Mar. 22, 1995

[87] PCT Pub. No.: WO94/24712

PCT Pub. Date: Oct. 27, 1994

[30] Foreign Application Priority Data

Apr. 22, 1993 [JP] Japan ................................. 5-095997
Dec. 29, 1993 [JP] Japan ................................. 5-351211

[51] Int. Cl.$^6$ .................................................. H01M 10/44
[52] U.S. Cl. .............................. 429/50; 429/122; 429/192; 429/199; 429/212; 429/213; 252/62.2; 252/500; 205/775; 205/793.5
[58] Field of Search ................................. 429/192, 199, 429/212, 213, 50, 122; 252/62.2, 500; 205/775, 793.5

[56] References Cited

U.S. PATENT DOCUMENTS 4,198,976 4/1979 Sekido et al. ............................ 429/191
4,629,540 12/1986 Genieès et al. ........................ 429/212

FOREIGN PATENT DOCUMENTS 0077169 4/1983 European Pat. Off. .
57-14547 1/1982 Japan .
3-20861 1/1991 Japan .
4-160766 6/1992 Japan .

OTHER PUBLICATIONS

International Search Report for International Application No. PCT/JP94/00656.

Sjoberg, Per et al., "Average local ionization energies on the molecular surfaces of aromatic systems as guides to chemical reactivity," Can. J. Chem. 68, pp. 1440–1443 (1990) no month available.

Hebre, Warren J. et al., "Molecular Orbital Theory of the Electronic Structure of Organic Compounds, XII. Conformations, Stabilities, and Charge Distributions in Monosubstituted Benzenes," J. Am. Chem. Soc., vol. 94:5, pp. 1496–1504 (1972).

Colonna, Francesco Paolo et al., "Analysis of the Electronic Factors Controlling the $N_{1s}$ and the First two n(a, b$_1$) Photoelectron Ionizations in N–Containing Monosubstituted Benzenes (Ph–NRR' and Ph–N=X)," Z. Naturforsch. 36a, 385–390 (1981) no month available.

Le Fave, Gene, "Some Reactions of the Trifluoromethyl Group in the Benzotrifluoride Series. I. Hydrolysis," J. Am. Chem. Soc., vol. 71, pp. 4148–4149 (1949) no month available.

(List continued on next page.)

Primary Examiner—Bruce F. Bell
Attorney, Agent, or Firm—Varndell Legal Group

[57] ABSTRACT

The present invention relates to a process for generating an energy such as electricity, a device therefor and a compound having a N—F bond and generating an energy such as electricity and a battery using the compound, and can provide a process for generating energy such as electricity by the use of materials for an active material for a battery, an electrolyte, or the like, which is handled easily and is superior in environmental acceptability.

33 Claims, 4 Drawing Sheets

OTHER PUBLICATIONS

Jones, Reuben G., "Ortho and Para Substituted Derivatives of Benzotribluoride," J. Am. Chem. Soc., vol. 69, pp. 2346–2350 (1947). No month available.

Patrick, Timothy B. et al., "Synthesis of Fluoroaromatic Amines," J. Org. Chem., vol. 39, pp. 1758–1761 (1974) no month available.

Umemoto, Teruo et al., "N–Fluoropyridinium Triflate And Its Analogs, The First Stable 1:1 Salts Of Pyridine Nucleus And Halogen Atom," Tetrahedron Letters, vol. 27, No. 28 pp. 3271–3274 (1986). No month available.

Umemoto, Teruo et al:, "N–Fluoropyridiniium Triflate And Its Derivatives: Useful Fluorinating Agents," Tetrahedron Letters, vol. 27, No. 37, pp. 4465–4468 (1986) no month available.

Umemoto, Teruo et al., "α–Fluorination of Sulfides with N–Fluoropyridinium Triflates," Bull. Chem. Soc. Jpn., vol. 59, pp. 3625–3629, (1986) no month available.

Umemoto, Teruo et al., "Base–Initiated Reactions Of N–Fluoropyridinium Salts; A Novel Cyclic Carbene Proposed As A Reactive Species," Tetrahedron Letters, vol. 28, No. 24, pp. 2705–2708, (1987).

Umemoto, Teruo et al., "Preparation of 2–Fluoropyridines via Base–Induced Decomposition of N–Fluoropyridinium Salts," J. Org. Chem., vol. 54, pp. 1726–1731, (1989) no month available.

Umemoto, Teruo, "N–Fluoropyridinium Triflate: An Electrophilic Fluorinating Agent," Org. Sym., vol. 69, pp. 129–143 (1990) no month available.

Umemoto, Teruo et al., "Power and Structure–Variable Fluorinating Agents. The N–Fluoropyridinium Salt System," J. Am. Chem. Soc., vol. 112, pp. 8563–8575 (1990) no month available.

Umemoto, Teruo et al., "Syntheses and Properties of N–Fluoropyridinium Salts," Bull. Chem. Soc. Jpn., vol. 64, pp. 1081–1092, (1991) no month available.

Umemoto, Teruo et al., "N–F 19–Fluorine Nuclear Magnetic Resonance of N–Fluoropyridinium Salts," J. Fluorine Chem., vol. 53, pp. 369–377 (1991) no month available.

Umemoto, Teruo et al., "Highly Selective Fluorinating Agents: A Counteranion–Bound N–Fluoropyridinium Salts System," J. Org. Chem., vol. 60, pp. 6563–6570 (1995) no month available.

Herbert F. Hunger et al., "Rate Capability and Electrochemical Stability of Carbon Fluorine Compounds in Organic electrolytes," J. Electrochem. Soc., vol. 122, No. 10, pp. 1288–1291. No month or year available.

ZINC, MAGNESIUM OR THE LIKE

PLATINUM PLATE, GOLD PLATE OR THE LIKE

PRESSED COMPOUND HAVING A N-F BOND

ZINC OR MAGNESIUM

COMPOUND HAVING A N-F BOND

PLATINUM PLATE OR NICKEL PLATE

MATERIAL FOR GENERATING ELECTRIC ENERGY

TECHNICAL FIELD

The present invention relates to a process for generating energy such as electricity, a device therefor and a compound having a N—F bond for generating energy such as electricity and a battery using the compound, and particularly relates to a process for generating energy such as electricity by the use of materials for an active material for a battery, an electrolyte, or the like, which can be handled easily and is superior in environmental acceptability.

BACKGROUND ARTS

As a typical conventional apparatus using a process to generate energy such as electricity, there is a battery, and various compounds are used as an electrolyte and an active material for positive electrodes.

Batteries are prerequisites as electric energy sources easily used for national livelihood or as important energy sources for highly developed apparatus, and various kinds of batteries have been researched and developed depending on the required characteristics.

Batteries typically comprise active materials for positive electrodes, electrolytes and active materials for negative electrodes, and are usually so manufactured in combination use of various different materials as to comply with the diversified requirements such as compactness, lightness or large size, and furthermore long life time, high output, high electromotive force, long-term low output, wide usable temperature range, safety, and the environmental acceptability. For example, primary lithium batteries known as a closed type primary battery are excellent in high energy density, low self-discharge rate, wide usable temperature range, strict sealing, or the like. Examples thereof are carbon fluoride/lithium batteries using organic electrolytic solution and carbon fluorides as active materials for positive electrodes, manganese dioxide/lithium batteries using manganese dioxides as active materials for positive electrodes, and copper oxide/lithium batteries using copper oxides as active materials for positive electrodes. The features of the respective batteries are high electromotive force and long storage life in the carbon fluoride/lithium batteries, high electromotive force and low price in the manganese dioxide/lithium batteries, and interchangeability with the conventional batteries (1.5 V) in the copper oxide/lithium batteries.

Also, as the primary lithium battery, there is a thionyl chloride/lithium battery having particularly high electromotive force and energy density. Thionyl chloride of that battery, which is in the form of liquid at room temperature, are used as both the active materials for the positive electrodes and the electrolytes. However, because thionyl chloride is poisonous, the use of it for general consumers is limited, and therefore they are inferior from a point of wide applicability.

Because the above-mentioned primary lithium batteries use liquids as the electrolytes, there is always a fear of leakage and problems that a decomposition gas is generated and the maximum usable temperature is limited up to the boiling point of the electrolytic solution. Therefore, it was proposed to use a solid material for electrolytes. For instance, a lithium battery using lithium iodide as a solid electrolyte and an iodine/poly(2-vinylpyridine) as the active material for the positive electrode (JP-A-81919/1978) was developed. However, because a stably bonded compound cannot be formed from iodine ($I_2$) and poly(2-vinylpyridine), iodine/poly(2-vinylpyridine) has a possibility of vaporization of poisonous and corrosive iodine. Therefore, when such a battery is used built in precision mechanical equipment and medical appliances, a strict sealing is required. As mentioned hereinabove, the conventional batteries have problems of leakage and toxicity and corrosivity of the battery materials, and such drawbacks that handling is not easy and, when a heavy metal is contained, it is inferior in the environmental acceptability.

An object of the present invention is to provide a novel process for generating energy such as electricity, which is featured by easy handling and is superior in the environmental acceptability, a device therefor and a compound having a N—F bond and generating energy such as electricity, in order to give a high electromotive force and a desired voltage.

DISCLOSURE OF THE INVENTION

The process of the present invention for generating energy such as electricity is such that energy such as electricity is generated by an electrochemical reaction between a compound having a N—F bond and a compound giving an electron to the mentioned compound.

PREFERRED EMBODIMENTS FOR THE INVENTION

Figure 1:
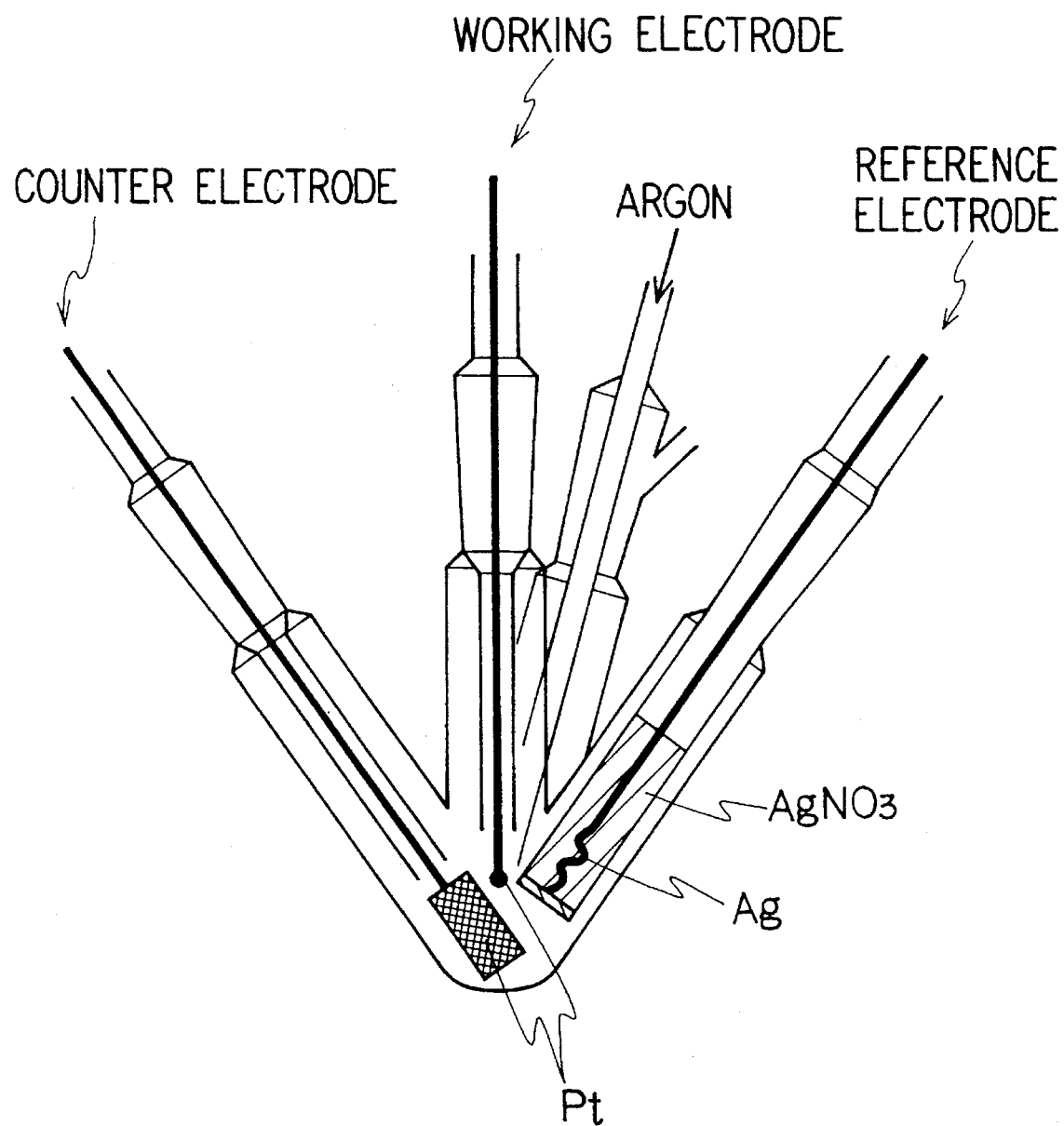
FIG. 1 is a schematic explanatory view of a battery for measuring an oxidation potential, which was used in Example 1.

As the compounds having a N—F bond, which are used in the present invention, there are, for example, N-fluorosulfonamide compound, N-fluorosulfonamide compound, N-fluoroquinuclidinium compound, N-fluoro-1, 4-diazoniabicyclo[2.2.2]octane compound N-fluorodisulfonimide compound, N-fluoroamide compound, N-fluorocarbamate compound and N-fluoropyridone compound.

Many of the above-mentioned compounds having a N—F bond are stable solids in a wide range of temperature, particularly even at high temperature. For instance, the melting point of N-fluoropyridinium trifluoromethanesulfonate is 185° to 187° C., the decomposition point of N-fluoropyridinium hexafluoroantimonate is 293° C., the decomposition point of N-fluoropyridinium-2-sulfonate is 232° to 235° C., the decomposition point of poly(2-vinyl-N-fluoropyridinium tetrafluoroborate) is 240° C., the melting point of N-fluoropyridinium trichloromethanesulfonate is 205.5° to 207° C., the melting point of N-fluoropyridinium tetrafluoroborate is 196.8° to 198° C., the decomposition point of N-fluoropyridinium hexafluorophosphate is 202° C., the decomposition point of N-fluoropyridinium hexafluoroarsenate is 230° C., the melting point of N-fluoropyridinium perchlorate is 225° to 227.5° C., the melting point of N-fluoro-2, 4, 6-trimethylpyridinium trifluoromethanesulfonate is 168° to 170° C., the melting point of N-fluoro-2,4,6-trimethylpyridinium fluorosulphate is 162° to 164° C., the melting point of N-fluoro-2,4,6-trimethylpyridinium tetrafluoroborate is 215° to 217° C., the melting point of N-fluoro-2,4,6-tri-t-butyl-pyridinium trifluoromethanesulfonate is 238° to 239° C., the melting point of N-fluoro-2,6-di-t-butyl-4-methylpyridinium trifluoromethanesulfonate is 158° to 159° C., the melting point of N-fluoro-1,2,3,4,5,6,7,8-octahydroacridinium trifluoromethanesulfonate is 150° to 152° C., the melting point of N-fluoro-2-fluoromethyl-4,6-dimethylpyridinium trifluoromethanesulfonate is 160° to 162° C., the melting point of N-fluoro-2-chloropyridinium trifluoromethanesulfonate is 149° to 151° C., the melting point of N-fluoro-3,5-dichloropyridinium tetrafluoroborate is 208° to 209° C., the melting point of N-fluoropentachloropyridinium tetrafluoroborate is 198° to 200° C., the melting point of N-fluoro-3,5-bis(trifluoromethyl)pyridinium trifluoromethanesulfonate is 193° to 195° C., the melting point of N-fluoro-2-acetylpyridinium trifluoromethanesulfonate is 151° to 152° C., the decomposition temperature of N-fluoro-5-(trifluoromethyl)pyridinium-2-sulfonate is 190° to 220° C., the melting point of N-fluoro-6-chloropyridinium-2-sulfonate is 171° to 173° C., the decomposition point of N-fluoroquinuclidinium trifluoromethanesulfonate is 266° to 268° C., the melting point of N-fluoroquinuclidinium heptafluorobutylate is 142° to 144° C., the decomposition point of N-fluoro-N'-methyl-1,4-diazoniabicyclo[2.2.2]octane di(trifluoromethanesulfonate) is 220° to 221° C., the melting point of N-fluoro-N'-chloromethyl-1,4-diazoniabicyclo[2.2.2]octane di(tetrafluoroborate) is 170° C., the melting point of N-fluoro-o-benzenedisulfonimide is 139° to 140° C., the melting point of N-fluorobenzenesulfonimide is 114° to 116° C., the melting point of N-fluoro-3,3-dimethyl-2,3-dihydro-1,2-benzothiazol-1,1-dioxide is 114° to 116° C., the melting point of (−)-N-fluoro-2,10-camphorsultam is 112° to 114° C., the melting point of (+)-N-fluoro-2-endo-methyl-2,10-camphorsultam is 151° to 154° C., and the melting point of N-fluoro-3,4,5,6-tetrachloro-2-pyridone is 102° to 104° C. That is to say, because of stable compounds at normal temperature, handling of them is easy during manufacturing as well as when used as a product, and because there is no heavy metal contained therein, the environmental acceptability is also superior. When used as an electrolyte, the compound becomes an excellent solid electrolyte, and since it is also an active material for a positive electrode, the compound itself can function as both the active material for the positive electrode and the electrolyte. When the compound is used as a material for a battery, a primary battery having a small size and a simple structure and having a structure free of liquid and gas leakage can be provided only by facing the positive and negative electrodes having active materials each other without providing electrolytic liquid and a separator therebetween.

Furthermore, the electromotive force can be changed by selecting various compounds having a N—F bond, which makes it possible to manufacture batteries complying with the applications and makes the interchangeability with the conventional batteries easy.

Many of the compounds having a N—F bond are known as fluorinating agents (JP-B-33707/1990, JP-A-295610/1988, JP-A-99062/1991, Bull. Chem. Soc. Jpn. 64, 1081(1991), Z. Chem. 5 64(1965), EP-A-470669, Abstract of 17th National Meeting on Fluorine Chemistry (Osaka, 1992) Pages 129–130, J. Fluorine Chem. 54, 207(1991), EP-A-526849, JP-A-504124/1992, J. Fluorine Chem., 55, 207(1991 ), J. Chem. Soc., Chem. Commun, 1992, 595, J. Org. Chem., 58, 2791(1993), J. Am. Chem. Soc., 106, 452(1984), J. Am. Chem. Soc., 108, 2445(1986), J. Fluorine Chem., 46, 297(1990), Tetrahedron Lett, 32, 1779(1988), Tetrahedron Lett., 29, 6087(1988), J. Am. Chem. Soc., 109, 7194(1987), JP-A-26264/1987, Synlett, 1991, 187, Tetrahedron Lett., 32, 1631(1991), Tetrahedron, 47, 7447(1991), Tetrahedron, 48, 1595 (1992), J. Org. Chem., 34, 2840(1969), J. Org. Chem., 35, 1545 (1970), J. Fluorine Chem., 52, 389(1991), J. Fluorine Chem., 34, 281 (1986)).

It was found out that the compounds having a N—F bond useful as the fluorinating agents are very excellent as the materials for generating electric energy, and thus the present invention was completed.

Among the compounds having a N—F bond of the present invention, which are effective components of the materials for generating electric energy, those particularly preferable as N-fluoropyridinium compounds are shown by the following formulae (I) and (II), Formula (I):

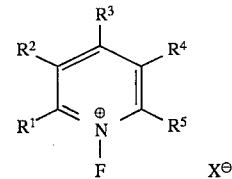

Formula (II):

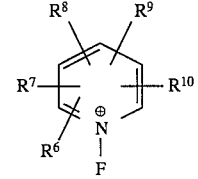

wherein $R^1$ to $R^{10}$ are the same or different, and any of them is hydrogen atom, a halogen atom, nitro, hydroxyl, cyano, or carbamoyl group; an alkyl group having 1 to 15 carbon atoms, or a substituted alkyl group of the aforesaid alkyl group by a halogen atom, hydroxyl, an alkoxy group having 1 to 5 carbon atoms, an aryloxy group having 6 to 10 carbon atoms, an acyl group having 1 to 5 carbon atoms, an acyloxy group having 1 to 5 carbon atoms or an aryl group having 6 to 10 carbon atoms;

an alkenyl group having 1 to 15 carbon atoms or a substituted alkenyl group of the aforesaid alkenyl group by a halogen atom or an aryl group having 6 to 10 carbon atoms;

an alkynyl group having 1 to 15 carbon atoms or a substituted alkynyl group of the aforesaid alkynyl group by a halogen atom or an aryl group having 6 to 10 carbon atoms;

an aryl group having 6 to 15 carbon atoms or a substituted aryl group of the aforesaid aryl group by a halogen atom or an alkyl group having 1 to 5 carbon atoms; an acyl group having 1 to 15 carbon atoms or a substituted acyl group of the aforesaid acyl group by a halogen atom; an alkoxycarbonyl group having 2 to 15 carbon atoms or a substituted alkoxycarbonyl group of the aforesaid alkoxycarbonyl group by a halogen atom or an aryl group having 6 to 10 carbon atoms;

an aryloxycarbonyl group having 7 to 15 carbon atoms or a substituted aryloxycarbonyl group of the aforesaid aryloxycarbonyl group by a halogen atom or an alkyl group having 1 to 5 carbon atoms;

an alkylsulfonyl group having 1 to 15 carbon atoms or a substituted alkylsulfonyl group of the aforesaid alkylsulfonyl group by a halogen atom or an aryl group having 6 to 10 carbon atoms;

an arylsulfonyl group having 6 to 15 carbon atoms or a substituted arylsulfonyl group of the aforesaid arylsulfonyl group by a halogen atom or an alkyl group having 1 to 5 carbon atoms;

an alkylsulfinyl group having 1 to 15 carbon atoms or a substituted alkylsulfinyl group of the aforesaid alkylsulfinyl group by a halogen atom or an aryl group having 6 to 10 carbon atoms;

an arylsulfinyl group having 6 to 15 carbon atoms or a substituted arylsulfinyl group of the aforesaid arylsulfinyl group by a halogen atom or an alkyl group having 1 to 5 carbon atoms;

an alkoxy group having 1 to 15 carbon atoms or a substituted alkoxy group of the aforesaid alkoxy group by a halogen atom or an aryl group having 6 to 10 carbon atoms;

an aryloxy group having 6 to 15 carbon atoms or a substituted aryloxy group of the aforesaid aryloxy group by a halogen atom or an alkyl group having 1 to 5 carbon atoms;

an acyloxy group having 1 to 15 carbon atoms or a substituted acyloxy group of the aforesaid acyloxy group by a halogen atom;

an acylthio group having 1 to 15 carbon atoms or a substituted acylthio group of the aforesaid acylthio group by a halogen atom;

an alkanesulfonyloxy group having 1 to 15 carbon atoms or a substituted alkanesulfonyloxy group of the aforesaid alkanesulfonyloxy group by a halogen atom or an aryl group having 6 to 10 carbon atoms;

an arenesulfonyloxy group having 6 to 15 carbon atoms or a substituted arenesulfonyloxy group of the aforesaid arenesulfonyloxy group by a halogen atom or an alkyl group having 1 to 5 carbon atoms;

a carbamoyl group substituted by an alkyl group having 1 to 5 carbon atoms or a substituted carbamoyl group of the aforesaid alkyl-substituted carbamoyl group by an aryl group having 6 to 10 carbon atoms;

a carbamoyl group substituted by an aryl group having 6 to 10 carbon atoms or a substituted carbamoyl group of the aforesaid aryl-substituted carbamoyl group by an alkyl group having 1 to 5 carbon atoms;

amino group substituted by an acyl group having 1 to 5 carbon atoms or substituted amino group of the aforesaid acyl-substituted amino group by a halogen group;

a N-fluoropyridinium salt group or a substituted N-fluoropyridinium salt group of the aforesaid N-fluoropyridinium salt group by a halogen atom, an aryl group having 6 to 10 carbon atoms or an alkyl group having 1 to 5 carbon atoms;

an N-alkylpyridinium salt group having 6 to 15 carbon atoms or a substituted N-alkylpyridinium group of the aforesaid N-alkylpyridinium salt group by a halogen atom, an aryl group having 6 to 10 carbon atoms or an alkyl group having 1 to 5 carbon atoms;

an N-arylpyridinium salt group having 11 to 15 carbon atoms or a substituted N-arylpyridinium group of the aforesaid N-arylpyridinium salt group by a halogen atom, an aryl group having 6 to 10 carbon atoms or an alkyl group having 1 to 5 carbon atoms;

or an organic polymer chain, and $R^1$ to $R^{10}$ may form, in various combinations, a ring structure with or without a hetero atom. One of $R^6$ to $R^{10}$ is —$RSO_3^-$ (R is a single bond or an alkylene group having 1 to 5 carbon atoms), and $X^-$ is a conjugate base of a Brønsted acid.

As Bronsted acids for preparing $X^-$, there are, for example, sulfonic acids such as methanesulfonic acid, butanesulfonic acid, benzenesulfonic acid, toluenesulfonic acid, nitrobenzenesulfonic acid, dinitrobenzenesulfonic acid, trinitrobenzenesulfonic acid, trifluoro-methanesulfonic acid, perfluorobutanesulfonic acid, perfluorooctanesulfonic acid, perfluoro(2-ethoxyethane) sulfonic acid, perfluoro(4-ethylcyclohexane)sulfonic acid, trichloromethanesulfonic acid, difluoromethanesulfonic acid, trifluoroethanesulfonic acid, fluorosulfonic acid, chlorosulfonic acid, camphorsulfonic acid, bromocamphorsulfonic acid, $\Delta^4$-cholestene-3-one-6-sulfonic acid, 1-hydroxy-p-menthane-2-sulfonic acid, p-styrenesulfonic acid, β-styrenesulfonic acid, vinylsulfonic acid, and perfluoro-3,6-dioxa-4-methyl-7-octenesulfonic acid; polysulfonic acids such as poly(vinylsulfonic acid), poly(p-styrenesulfonic acid), poly(2-acrylamide-2-methyl-1-propanesulfonic acid), and a copolymer thereof with styrene, and poly(perfluoro-3,6-dioxa-4-methyl-7-octenesulfonic acid), and a copolymer thereof with tetrafluoroethylene; mineral acids such as sulfuric acid, phosphoric acid and nitric acid; halogen acids such as hydrogen fluoride, hydrofluoric acid, hydrogen chloride, hydrochloric acid, hydrogen bromide, hydrobromic acid, hydrogen iodide, hydroiodic acid, perchloric acid, perbromic acid, periodic acid, chloric acid, and bromic acid; monoalkyl sulfates such as monomethyl sulfate and monoethyl sulfate; carboxylic acids such as acetic acid, formic acid, trichloroacetic acid, trifluoroacetic acid, pentafluoropropionic acid, dichloroacetic acid, and acrylic acid; polycarboxylic acids such as poly(acrylic acid), poly(perfluoro-3,6-dioxa-4-methyl-7-octenoic acid) and a copolymer thereof with tetrafluoroethylene; compounds of Lewis acids such as $HBF_4$, $HPF_6$, $HSbF_4$, $HSbF_6$, $HAsF_6$ and $HBCl_3F$ with hydrogen halides; aryl-substituted boron-compounds such as

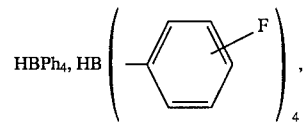

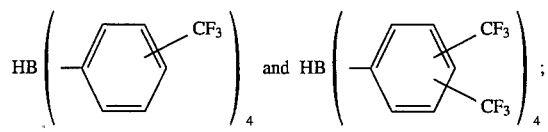

acidic amide compounds such as

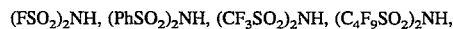

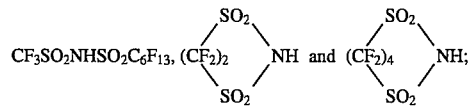

carbon acid compounds such as $(FSO_2)_3CH$, $(CF_3SO_2)_3CH$, $(PhOSO_2)_3CH$, $(CF_3SO_2)_2CH_2$, $(CF_3SO_2)_3CH$, $(C_4F_9SO_2)_3CH$ and $(C_8F_{17}SO_2)_3CH$.

As the compounds shown by the formula (I) among the above-mentioned N-fluoropyridinium compounds, for example, those given in Table I are preferable, but the compounds shown by the formula (I) are not limited thereto.

Formula (I):

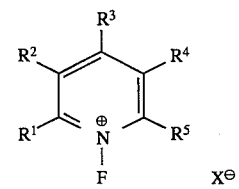

In the Table I, n is an integer of 10 to 100,000, m is an integer of 10 to 10,000, and p and q each are positive integers of $1 < p+q \leq 1000$.

TABLE I

| R¹ | R² | R³ | R⁴ | R⁵ | X |
|---|---|---|---|---|---|
| H | H | H | H | H | $BF_4$ |
| H | H | H | H | H | $PF_6$ |
| H | H | H | H | H | $SbF_6$ |
| H | H | H | H | H | $SbCl_5F$ |
| H | H | H | H | H | $AsF_4$ |
| H | H | H | H | H | $AsF_6$ |
| H | H | H | H | H | $ClO_4$ |
| H | H | H | H | H | F |
| H | H | H | H | H | $F(HF)_n$ |
| H | H | H | H | H | $H_2PO_4$ |
| H | H | H | H | H | $HSO_4$ |
| H | H | H | H | H | $AlCl_4$ |
| H | H | H | H | H | $AlCl_3F$ |
| H | H | H | H | H | $SiF_5$ |
| H | H | H | H | H | $IO_4$ |
| H | H | H | H | H | $BPh_4$ |
| H | H | H | H | H | $B(C_6F_5)_4$ |
| H | H | H | H | H | $B(C_6H_4CF_3)_4$ |
| H | H | H | H | H | $B(C_6H_3(CF_3)_2)_4$ |
| H | H | H | H | H | $OSO_2CH_3$ |
| H | H | H | H | H | $OSO_2CF_3$ |
| H | H | H | H | H | $OSO_2CCl_3$ |
| H | H | H | H | H | $OSO_2CH_2CF_3$ |
| H | H | H | H | H | $OSO_2F$ |
| H | H | H | H | H | $OSO_2Cl$ |
| H | H | H | H | H | $OSO_2OCH_3$ |
| H | H | H | H | H | $OSO_2C_4F_9$ |
| H | H | H | H | H | $OSO_2C_8F_{17}$ |

TABLE I-continued

| R¹ | R² | R³ | R⁴ | R⁵ | X |
|---|---|---|---|---|---|
| H | H | H | H | H | OSO₂Ph |
| H | H | H | H | H | 4-CH₃-C₆H₄-OSO₂ |
| H | H | H | H | H | 4-NO₂-C₆H₄-OSO₂ |
| H | H | H | H | H | 2,4-(NO₂)₂-C₆H₃-OSO₂ |
| H | H | H | H | H | 4-Cl-C₆H₄-OSO₂ |
| H | H | H | H | H | 4-CF₃-C₆H₄-OSO₂ |
| H | H | H | H | H | perfluorocyclohexyl-OSO₂CF₂ (C₆F₁₁-OSO₂CF₂) |
| H H | H H | H H | H H | H H | N(SO₂F)₂, N(SO₂CF₃)₂ |
| H | H | H | H | H | cyclic -SO₂-(CF₂)₂-N-SO₂- |
| H H | H H | H H | H H | H H | C(SO₂F)₃, C(SO₂CF₃)₃ |

TABLE I-continued

| R¹ | R² | R³ | R⁴ | R⁵ | X |
|---|---|---|---|---|---|
| H | H | H | H | H | $-\!\!\left(\!\!CH_2\!-\!\!\underset{OSO_2-}{CH}\!\!\right)_{\!\!n}\!\!-$ |
| H | H | H | H | H | $-\!\!\left(\!\!CH_2\!-\!\!\underset{C_6H_4\text{-}OSO_2-}{CH}\!\!\right)_{\!\!n}\!\!-$ |
| H | H | H | H | H | $-\!\!\left[\!\!\left(\!CF_2\!-\!\underset{OSO_2-CF_2CF_2-O-CFCF_2-O-CF}{\underset{|}{CF}}\!\right)_{\!p}\!\!\left(CF_2\!-\!CF_2\right)_{\!q}\!\right]_{\!m}\!\!-$ (with CF₃ branch) |
| CH₃ | H | H | H | H | BF₂ |
| H | CH₃ | H | H | H | PF₆ |
| H | H | CH₃ | H | H | AsF₆ |
| CH₃ | CH₃ | H | H | H | SbF₆ |
| H | H | CH₃ | H | H | OSO₂CF₃ |
| H | CH₃ | CH₃ | H | H | OSO₂Ph |
| CH₃ | H | H | H | H | OSO₂C₄F₉ |
| CH₃ | H | CH₃ | H | H | OSO₂F |
| H | CH₃ | H | CH₃ | CH₃ | OSO₂CF₃ |
| CH₃ | H | H | H | H | OSO₂CF₃ |
| CH₃ | CH₃ | CH₃ | CH₃ | CH₃ | OCOCF₃ |
| CH₃ | CH₃ | H | CH₃ | CH₃ | BF₄ |
| CH₃ | CH₃ | CH₃ | CH₃ | CH₃ | OSO₂CF₃ |
| CH₃ | CH₃ | CH₃ | CH₃ | CH₃ | OCOPh |

TABLE I-continued

| R¹ | R² | R³ | R⁴ | R⁵ | X |
|---|---|---|---|---|---|
| CH₃ | CH₃ | CH₃ | CH₃ | CH₃ | OCOCH₃ |
| CH₃ | CH₃ | CH₃ | CH₃ | CH₃ | OSO₂CF₃ |
| C₂H₅ | H | H | H | H | OSO₂CF₃ |
| C₂H₅ | H | C₂H₅ | H | C₂H₅ | OSO₂CF₃ |
| C₄H₉ | H | H | H | H | OSO₂CF₃ |
| C₄H₉ | H | H | H | C₄H₉ | OSO₂CF₃ |
| C₈H₁₇ | H | H | H | H | OSO₂CF₃ |
| PhCH₂ | H | H | H | H | OSO₂CF₃ |
| CH₂OH | H | H | H | H | OSO₂CF₃ |
| CH₂OH | H | H | H | CH₂OH | OSO₂CF₃ |
| CH₂OCH₃ | H | H | H | H | OSO₂CF₃ |
| CH₂OCH₃ | H | H | H | CH₂OCH₃ | OSO₂CF₃ |
| CH₂OCOCH₃ | H | H | H | H | OSO₂CF₃ |
| CH₂OCOCH₃ | H | H | H | CH₂OCOCH₃ | OSO₂CF₃ |
| CH₂OCOPh | H | H | H | H | OSO₂CF₃ |
| CH₂OCH₃ | H | CH₂OCH₃ | H | CH₂OCH₃ | OSO₂CF₃ |
| CH₂F | H | H | H | H | OSO₂CF₃ |
| CH₂Cl | H | H | H | H | OSO₂CF₃ |
| CH₂F | H | H | H | CH₂F | OSO₂CF₃ |
| CHF₂ | H | H | H | H | OSO₂CF₃ |
| CF₃ | CF₂Cl | H | H | H | OSO₂CF₃ |
| H | H | H | H | H | OSO₂CF₃ |
| CCl₃ | H | H | H | H | OSO₂CF₃ |
| CF₃ | CF₃ | CF₃ | H | CF₃ | OSO₂CF₃ |
| CF₃ | H | H | H | H | OSO₂CF₃ |
| CF₃ | H | CF₃ | H | H | OSO₂CF₃ |
| CCl₃ | H | CCl₃ | H | CCl₃ | OSO₂CF₃ |
| CCl₃ | H | CCl₃ | H | H | OSO₂CF₃ |
| CF₃ | H | CF₃ | H | CF₃ | OSO₂CF₃ |
| CF₃ | CF₃ | CF₃ | CF₃ | CF₃ | OSO₂CF₃ |
| CF₃ | CF₃ | CF₃ | CF₃ | CF₃ | OSO₂CF₃ |
| C₂F₅ | H | C₂F₅ | H | H | OSO₂CF₃ |
| H | H | CF(CF₃)₂ | H | H | OSO₂CF₃ |
| H | H | H | H | H | OSO₂CF₃ |
| CH₃ | F | H | H | H | OSO₂CF₃ |
| F | H | H | H | H | OSO₂CF₃ |
| H | F | H | H | H | OSO₂CF₃ |
| Cl | H | H | H | H | OSO₂CF₃ |
| H | Br | H | H | H | OSO₂CF₃ |
| H | I | H | H | H | OSO₂CF₃ |
| Cl | H | H | H | H | OSO₂CF₃ |
| H | Cl | H | H | H | OSO₂CF₃ |
| Cl | Cl | H | H | H | OSO₂CF₃ |
| H | H | Cl | H | H | OSO₂CF₃ |
| Cl | H | H | Cl | Cl | OSO₂CF₃ |
| Cl | H | H | Cl | H | OSO₂CF₃ |
| Cl | H | Cl | H | Cl | OSO₂CF₃ |
| Cl | Cl | Cl | Cl | Cl | OSO₂CF₃ |
| F | Cl | F | Cl | F | OSO₂CF₃ |

TABLE I-continued
| R¹ | R² | R³ | R⁴ | R⁵ | X |
|---|---|---|---|---|---|
| F | F | F | F | F | $OSO_2CF_3$ |
| F | F | $CF_3$ | F | F | $OSO_2CF_3$ |
| Cl | Cl | $CF_3$ | Cl | Cl | $OSO_2CF_3$ |
| $CF_3$ | F | $CF_3$ | F | $CF_3$ | $OSO_2CF_3$ |
| $CF_3$ | Cl | $CF_3$ | Cl | $CF_3$ | $OSO_2CF_3$ |
| CN | Cl | CN | Cl | CN | $OSO_2CF_3$ |
| $COOCH_3$ | Cl | $COOCH_3$ | Cl | $COOCH_3$ | $OSO_2CF_3$ |
| Cl | Cl | $NO_2$ | H | Cl | $OSO_2CF_3$ |
| Ph | H | H | H | H | $OSO_2CF_3$ |
| H | H | Ph | H | Ph | $OSO_2CF_3$ |
| Ph | H | H | H | Ph | $OSO_2CF_3$ |
| Ph | H | Ph | H | Ph | $OSO_2CF_3$ |
| 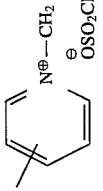 | H | H | H | H | $OSO_2CF_3$ |
| 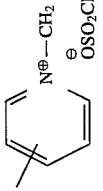 | 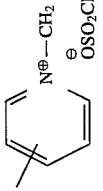 | H | H | H | $OSO_2CH_3$ |
| 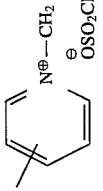 | H | H | H | H | $OSO_2CF_3$ |
| 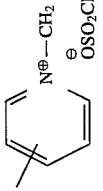 | H | H | H | H | $BF_4$ |
| $CH_3$ | H |  | H | H | $SbF_6$ |

TABLE I-continued

| $R^1$ | $R^2$ | $R^3$ | $R^4$ | $R^5$ | X |
|---|---|---|---|---|---|
| CH₃ | H | 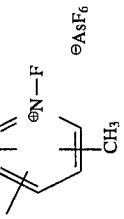 CH₃—⊕N—F—CH₃  ⊖AsF₆ | H | CH₃ | AsF₆ |
| H | Cl | 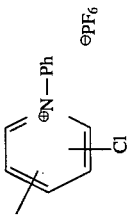 ⊕N—Ph  ⊖PF₆  Cl | H | H | PF₆ |
| H | H |  ⊕N—CH₂CF₃  ⊖OSO₂CF₃ | H | H | OSO₂CF₃ |
| COCH₃ | H | H | H | H | OSO₂CF₃ |
| COCH₃ | H | H | H | COCH₃ | OSO₂CF₃ |
| COPh | H | H | H | H | OSO₂CF₃ |
| CHO | H | H | H | H | OSO₂CF₃ |
| COOCH₃ | H | COOCH₃ | H | H | OSO₂CF₃ |
| COOC₂H₅ | H | H | H | COOC₂H₅ | OSO₂CF₃ |
| COOCH₃ | H | H | H | COOCH₃ | OSO₂CF₃ |
| COOPh | H | H | H | H | OSO₂CF₃ |
| CONH₂ | H | H | H | H | OSO₂CF₃ |
| H | CON(CH₃)₂ | CONPh₂ | H | CONH₂ | OSO₂CF₃ |
| CONH₂ | H | NO₂ | H | H | OSO₂CF₃ |
| H | H | H | H | H | OSO₂CF₃ |
| CN | H | CN | H | H | OSO₂CF₃ |
| CN | H | CN | H | CN | OSO₂CF₃ |
| CN | H | H | H | H | OSO₂CF₃ |
| H | NHCOCH₃ | H | H | H | OSO₂CF₃ |
| H | NHCOPh | H | H | H | OSO₂CF₃ |
| SO₂CH₃ | H | SOPh | H | H | OSO₂CF₃ |
| H | SO₂Ph | H | H | SO₂CH₃ | OSO₂CF₃ |
| SO₂CH₃ | H | H | H | H | OSO₂CF₃ |
| SOCH₃ | H | H | H | H | OSO₂CF₃ |
| H | OH | H | H | H | OSO₂CF₃ |
| OCH₃ | H | OC₂H₅ | H | H | OSO₂CF₃ |
| H | H | H | H | H | OSO₂CF₃ |

TABLE I-continued

| R¹ | R² | R³ | R⁴ | R⁵ | X |
|---|---|---|---|---|---|
| ![menthyloxy] | H | H | H | H | $OSO_2CF_3$ |
| H | $OCH_3$ | H | $OCH_3$ | H | $OSO_2CF_3$ |
| OPh | H | H | H | H | $OSO_2CF_3$ |
| OPh | H | H | H | OPh | $OSO_2CF_3$ |
| $OCOCH_3$ | H | H | H | H | $OSO_2CF_3$ |
| H | OCOPh | H | H | H | $OSO_2CF_3$ |
| $OSO_2CH_3$ | H | H | H | H | $OSO_2CF_3$ |
| H | $OSO_2Ph$ | H | H | H | $OSO_2CF_3$ |
| H | ‒(CH=CH)₂‒ | | H | H | $OSO_2CF_3$ |
| H | ‒(CH=CH)₂‒ | | H | $BF_4$ | |
| H | ‒(CH=CH)₂‒ | | H | $AsF_6$ | |
| H | ‒(CH=CH)₂‒ | $CH_3$ | H | $CH_3$ | $SbF_6$ |
| H | ‒(CH₂)₃‒ | | H | H | $OSO_2CH_3$ |
| H | ‒(CH₂)₄‒ | | H | H | $OSO_2CF_3$ |
| H | ‒(CH₂)₅‒ | | H | H | $OSO_2CF_3$ |
| H | ‒(CH₂)₄‒ | | ‒(CH₂)₄‒ | | $OSO_2CF_3$ |
| H | ‒CH₂OCH₂‒ ‒COHNCO‒ ‒COOCO‒ | | H | H | $OSO_2CH_3$ $OSO_2CH_3$ $OSO_2CF_3$ |
| H | H | H | H | H | $OSO_2CF_3$ |
| ‒(CH‒CH₂)ₙ‒ | ‒(CH‒CH₂)ₙ‒ | | H | H | $BF_4$ |

TABLE I-continued

| R¹ | R² | R³ | R⁴ | R⁵ | X |
|---|---|---|---|---|---|
| H | H | $-(CH-CH_2)_n-$ | H | H | $SbF_6$ |
| $-O-(CH-CH_2)_n-$ | H | H | H | H | $OSO_2CF_3$ |
| $-CH_2-(CH-CH_2)_n-$ | H | H | H | H | $PF_6$ |
| $-O-CH_2-(CH-CH_2)_n-$ | H | H | H | H | $AsF_6$ |
| H | $-O-CO-(CH-CH_2)_n-$ | H | H | H | $SbF_6$ |
| H | $-NH-CO-(CH-CH_2)_n-$ | H | H | H | $OSO_2CF_3$ |
| $-(CH-CH_2)_n-$ | H | H | H | H | $OSO_2CF_3$ |
| $CH_3$ | H | $-(CH-CH_2)_n-$ | H | H | $OSO_2CF_3$ |
| H | $CH_3$ | $-(CH-CH_2)_n-$ | H | H | $OSO_2CF_3$ |
| $-(CH-CH_2)_n-$ | H | $CH_3$ | H | $CH_3$ | $OSO_2CF_3$ |

TABLE I-continued

| R¹ | R² | R³ | R⁴ | R⁵ | X |
|---|---|---|---|---|---|
| $CH_3$ | $CH_3$ | $-(CH-CH_2)_n-$ | $CH_3$ | $CH_3$ | $OSO_2CF_3$ |
| Cl | H | $-(CH-CH_2)_n-$ | H | H | $OSO_2CF_3$ |
| Cl | H | $-(CH-CH_2)_n-$ | H | Cl | $OSO_2CF_3$ |
| Cl | Cl | $-(CH-CH_2)_n-$ | H | Cl | $OSO_2CF_3$ |
| Cl | Cl | $-(CH-CH_2)_n-$ | Cl | Cl | $OSO_2CF_3$ |
| F | F | $-(CH-CH_2)_n-$ | F | F | $AsF_6$ |
| H | H | $[-(CH-CH_2)_p-(CH_2-CH_2)_q-]_m$ | H | H | $OSO_2CF_3$ |
| H | H | $[-(CH-CH_2)_p-(CH-CH_2)_q-C_6H_5]_m$ | H | H | $OSO_2CF_3$ |
| H | H | $[-(CH-CH_2)_p-(CH-CH_2)_q-C_6H_4-(CH-CH_2)_q-]_m$ | H | H | $OSO_2CF_3$ |

TABLE I-continued

| R$^1$ | R$^2$ | R$^3$ | R$^4$ | R$^5$ | X |
|---|---|---|---|---|---|
| $\left[-(CF-CF_2)_p-(CF_2-CF_2)_q-\right]_m$ | H | $-(CF-CF_2)_n-$ | H | H | OSO$_2$CF$_3$ |
| $\left[-(CF(CF_3)-CF_2)_p-(CF_2-CF_2)_q-\right]_m$ | H | H | H | H | OSO$_2$CF$_3$ |
| $\left[-(CF(OCF_3)-CF_2)_p-(CF_2-CF_2)_q-\right]_m$ | H | H | H | H | OSO$_2$CF$_3$ |
| $-(CH-CF_2)_n-$ | H | H | H | H | OSO$_2$CF$_3$ |
| H | $-(CH-CF_2)_n-$ | H | H | H | OSO$_2$CF$_3$ |
| H | H | $-(CH-CF_2)_n-$ | H | H | OSO$_2$CF$_3$ |
| $-(CF-CF_2)_n-$ | H | H | H | H | OSO$_2$CF$_3$ |
| H | $-(CF-CF_2)_n-$ | H | H | H | OSO$_2$CF$_3$ |
| H | H | $-(CF-CF_2)_n-$ | H | H | OSO$_2$CF$_3$ |

As the compounds shown by the formula (II) among the above-mentioned N-fluoropyridinium compounds, for example, those given in Table II are preferable, but the compounds shown by the formula (II) are not limited thereto.

Formula (II):

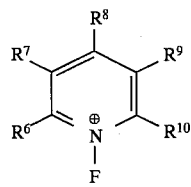

TABLE II

| $R^6$ | $R^7$ | $R^8$ | $R^9$ | $R^{10}$ |
|---|---|---|---|---|
| H | H | H | H | $SO_3^\ominus$ |
| H | H | H | $SO_3^\ominus$ | H |
| H | H | $SO_3^\ominus$ | H | H |
| $CH_3$ | H | H | H | $SO_3^\ominus$ |
| H | H | $CH_3$ | H | $SO_3^\ominus$ |
| H | H | $C_2H_5$ | H | $SO_3^\ominus$ |
| H | H | $CH_2CH_2CH_3$ | H | $SO_3^\ominus$ |
| H | H | $CH(CH_3)_2$ | H | $SO_3^\ominus$ |
| H | H | $C(CH_3)_3$ | H | $SO_3^\ominus$ |
| $C_4H_9$ | H | H | H | $SO_3^\ominus$ |
| $CH_3$ | H | $CH_3$ | H | $SO_3^\ominus$ |
| Cl | H | H | H | $SO_3^\ominus$ |
| $CCl_3$ | H | H | H | $SO_3^\ominus$ |
| H | $CCl_3$ | H | H | $SO_3^\ominus$ |
| $CF_3$ | H | H | H | $SO_3^\ominus$ |
| H | $CF_3$ | H | H | $SO_3^\ominus$ |
| H | H | H | $CF_3$ | $SO_3^\ominus$ |
| $CF_3$ | H | $CF_3$ | H | $SO_3^\ominus$ |
| H | $CF_3$ | H | Cl | $SO_3^\ominus$ |
| H | Cl | H | $CF_3$ | $SO_3^\ominus$ |
| $CH_2SO_3^\ominus$ | H | H | H | H |
| $CH_2CH_2SO_3^\ominus$ | H | H | H | H |
| H | $NO_2$ | H | H | $SO_3^\ominus$ |
| $SO_3^\ominus$ | H | H | | $+CH=CH)_2$ |
| $SO_3^\ominus$ | H | $CH_3$ | | $+CH=CH)_2$ |

As the N-fluoropyridinium compounds, also there can be, for example, N-fluoropyridinium pyridine heptafluorodiborate having the following formula.

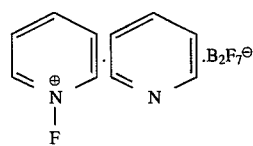

or

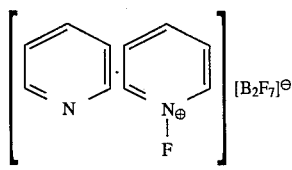

Among the compounds having a N—F bond, particularly preferable ones as the N-fluorosulfonamide compounds are shown by the following formula (III):

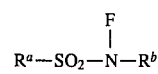

(wherein $R^a$ and $R^b$ are the same or different, and each is an alkyl group having 1 to 15 carbon atoms or a substituted alkyl group of the aforesaid alkyl group by a halogen atom or an aryl group having 6 to 10 carbon atoms, an aryl group having $C_6$ to $C_{15}$ carbon atoms or a substituted aryl group of the aforesaid aryl group by a halogen atom, nitro, cyano, an acyl group having 1 to 5 carbon atoms or an alkyl group having 1 to 5 carbon atoms, or a pyridyl group or a substituted pyridyl group of the aforesaid pyridyl group by a halogen atom. $R^a$ and $R^b$ may form the ring structure with or without a hetero atom, and $R^b$ may be a hydrogen atom). For example, there are

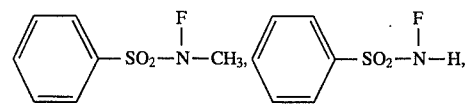

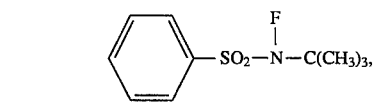

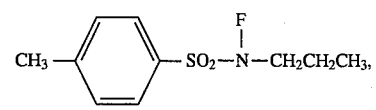

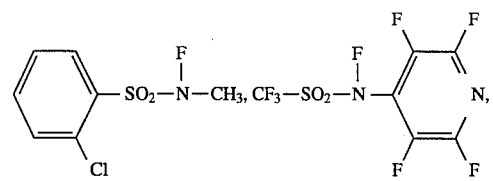

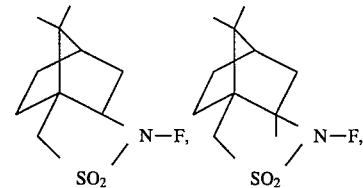

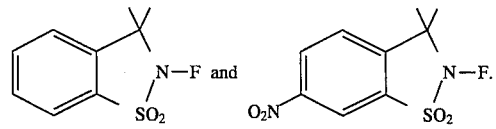

Among the compounds having a N—F bond, particularly preferable ones as the N-fluoroquinuclidinium compounds are shown by the following formula (IV)

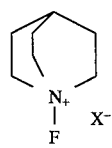

(IV)

(X is a conjugate base of the Bronsted acid mentioned hereinabove.) For example, there are

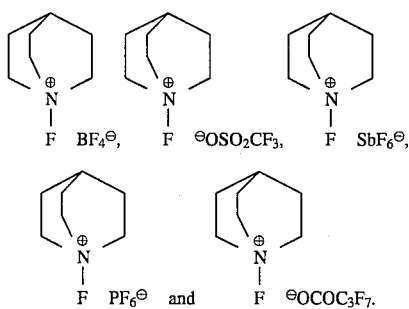

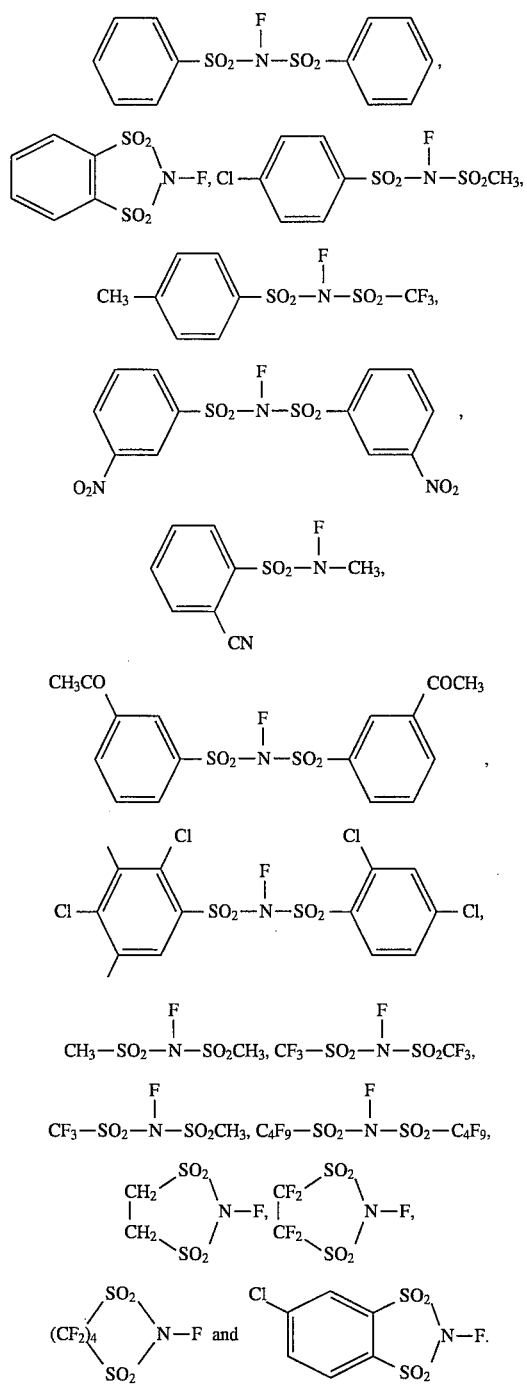

Among the compounds having a N—F bond, particularly preferable ones as N-fluoro-1,4-diazoniabicyclo[2.2.2]octane compounds are shown by the following formula (V).

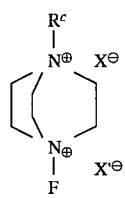

($R^c$ is an alkyl group having 1 to 15 carbon atoms or a substituted alkyl group of the aforesaid alkyl group by a halogen atom, nitro, cyano, an acyl group having 1 to 5 carbon atoms, an alkoxy group having 1 to 5 carbon atoms, an alkoxycarbonyl group having 2 to 5 carbon atoms or an aryl group having 6 to 10 carbon atoms, and X and X' are the same or different, and each is a conjugate base of the Bronsted acid mentioned hereinabove.) For example, there are

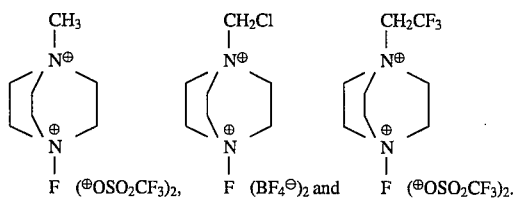

Among the compounds having a N—F bond, particularly preferable ones as the N-fluorodisulfonimide compounds are shown by the following formula (VI):

(wherein, $R^d$ and $R^e$ are the same or different, and each is an alkyl group having 1 to 15 carbon atoms or a substituted alkyl group of the aforesaid alkyl group by a halogen atom or an aryl group having 6 to 16 carbon atoms, or an aryl group having 6 to 10 carbon atoms or a substituted aryl group of the aforesaid aryl group by a halogen atom, nitro, cyano, an acyl group having 1 to 5 carbon atoms or an alkyl group having 1 to 5 carbon atoms. $R^d$ and $R^e$ may form the ring structure with or without a hetero atom, or are so united as to be an aromatic ring structure having 6 to 10 carbon atoms or so formed that a halogen atom, nitro, cyano, an acyl group having 1 to 5 carbon atoms or an alkyl group having 1 to 5 carbon atoms substitutes the aforesaid aromatic ring structure.) For example, there are Among the compounds having a N—F bond, particularly preferable ones as the N-fluoroamide compounds are shown by the following formula (VII):

(wherein $R^f$ and $R^g$ are the same or different, and each is hydrogen atom, a halogen atom, an amino group or a substituted amino group of the aforesaid amino group by an alkyl group having 1 to 5 carbon atoms, an alkyl group having 1 to 15 carbon atoms or a substituted alkyl group of the aforesaid alkyl group by a halogen atom or an aryl group having 6 to 10 carbon atoms, or an aryl group having 6 to 15 carbon atoms or a substituted aryl group of the aforesaid aryl group by a halogen atom, nitro, cyano, an acyl group having 1 to 5 carbon atoms or an alkyl group having 1 to 5 carbon atoms. $R^f$ and $R^g$ may form the ring structure with or without a hetero atom.) For example, there are $CH_3NFCHO$, $C_2H_5NFCHO$, $CH_3CONFCH_3$,

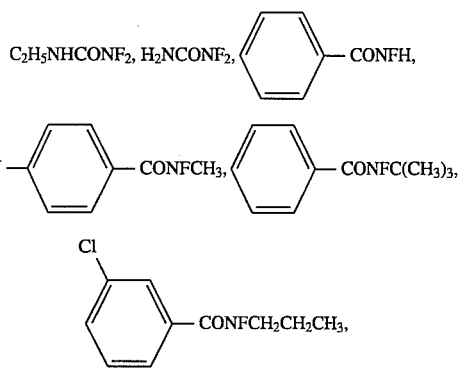

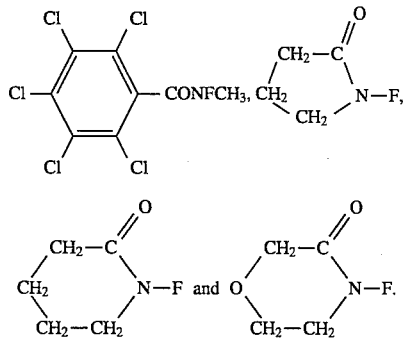

Among the compounds having a N—F bond, particularly preferable ones as the N-fluorocarbamate compounds are shown by the following formula:

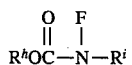 (VIII)

(wherein $R^h$ and $R^i$ are the same or different, and each is an alkyl group having 1 to 15 carbon atoms or a substituted alkyl group of the aforesaid alkyl group by a halogen atom or an aryl group having 6 to 16 carbon atoms, or an aryl group having 6 to 10 carbon atoms or a substituted aryl group of the aforesaid aryl group by a halogen atom, nitro, cyano, an acyl group having 1 to 5 carbon atoms or an alkyl group having 1 to 5 carbon atoms. $R^i$ may be hydrogen atom, and $R^h$ and $R^i$ may form the ring structure with or without a hetero atom. Or $R^h$ and $R^i$ are so united as to be an aromatic ring structure having 6 to 10 carbon atoms, or so formed that a halogen atom, nitro, cyano, an acyl group having 1 to 5 carbon atoms or an alkyl group having 1 to 5 carbon atoms substitutes the aforesaid aromatic ring structure.) For example there are $CH_3OCONFH$, $C_2H_5OCONFH$, $CH_3OCONFCH_3$,

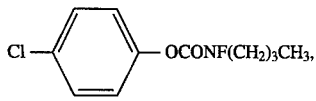

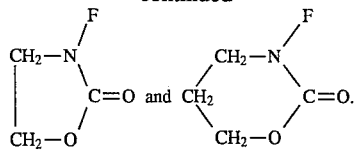

Among the compounds having a N—F bond, particularly preferable ones as the N-fluoropyridone compounds are shown by the following formula (IX):

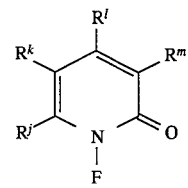

(wherein $R^j$ to $^m$ are the same as the group defined as $R^1$ to $R^5$ in the formula (I).) For example, there are

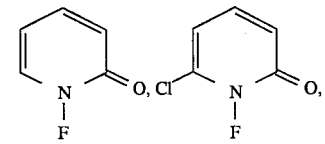

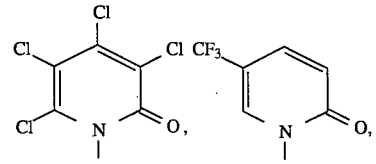

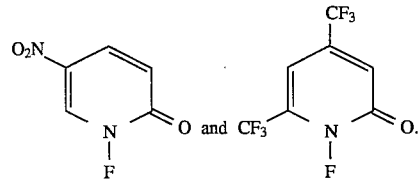

Also as the compounds having a N—F bond, for example,

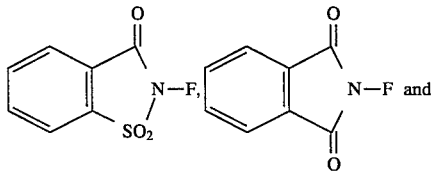

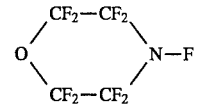

may be used.

The materials for generating electric energy of the present invention may be in the form of powder or a film.

The materials for electric energy of the present invention are useful specifically as active materials for positive electrodes of batteries and/or electrolytes as mentioned hereinabove. When used as the active materials for the positive electrodes, the compounds having the above-mentioned N—F bond have various different electromotive forces because of a variety of molecular weights and structures.

Generally an electromotive force is related to an electron deficiency of N—F bond, or electrical characteristics of a substituent to be bonded to nitrogen atom of N—F, particularly electron attractive and donative characteristics. When the compound having N—F bond is the N-fluoropyridinium compound, the electromotive force depends on electrical characteristics of the substituents on the pyridine ring and the number of substituents. Therefore, it is possible to obtain the desired electromotive force by selecting the kind, combination and the number of substituents. When the materials of the present invention are used as active materials for the positive electrodes together with various materials for the negative electrodes, an electromotive force in the range of from about 0.5 to about 4.5 V can be obtained.

In the case of the N-fluoropyridinium compound, when an electromotive force exceeding 3 V is required, a pyridine ring may have substituents of electron attractive groups. As the preferable electron attractive group, there are, for example, a halogen atom such as fluorine atom, chlorine atom or bromine atom, nitro, a trihalomethyl group, cyano, an acyl group and an alkoxycarbonyl group. Meanwhile, when an electromotive force for interchangeability with 1.5 V and 2 V batteries is required, the pyridine ring may have substituents of, for example, electron donative groups. As the preferable electron donative group, there are, for example, an alkyl group such as methyl or ethyl; an alkoxy group such as methoxy or ethoxy; an aryloxy group such as phenoxy or tolyloxy and the like.

Many of the compounds having a N—F bond of the present invention have a melting point of not less than about 100° C. as mentioned hereinabove, and therefore can be used as the active materials for the positive electrodes and/or solid electrolytes, which can be used at a high temperature. When used as the active materials for the positive electrodes, the compounds react with lithium, zinc and magnesium of the negative electrodes, and a protective film comprising metal fluorides is formed at an interface therebetween. With that film, batteries can be stored stably for a long period of time without short-circuit and also with almost no self-discharge. A separator is naturally not necessary. Furthermore, when there occurs an electrochemical reaction of the compounds of the present invention with the active materials (metal) for the negative electrodes, metal ions diffuse into the compounds of the present invention, thereby forming metal complex having ionic conductivity. Thus even if the above-mentioned reaction advances, the ionic conductivity can be maintained. When used as the solid electrolytes, the compounds having a low internal resistance are preferable, in other words, as the compounds giving a high ionic conductivity, for the $X^-$ portion of the salt structure, particularly preferable are, for example, trifluoromethanesulfonate, tetrafluoroborate, hexafluoroantimonate, hexafluoroarsenate, tetrakis-[bis(trifluoromethyl)phenyl]borate, perchlorate and hexafluorophosphate.

Then there is explained a preferable battery structure using the compound having a N—F bond of the present invention, but the present invention is not limited thereto.

(1) When the compounds having a N—F bond of the present invention is used only on the active materials for the positive electrodes for a battery using electrolytic solution.
[Preparation of positive electrode]

In case where the compounds having a N—F bond of the present invention are in the form of powder, they are made into the desired form by pressing or the like, or, if necessary, are mixed with, for example, a binder and an electroconductive agent and made into the desired form together with a current collector by pressing. As the binder, there are preferably used, for example, usual binders such as poly(tetrafluoroethylene) powder, carboxymethylcellulose, and poly(vinyl alcohol); as the electroconductive agent, there are preferably used, for example, nickel powder, fine metal fiber, and carbons such as graphite and acetylene black; and as the current collector, there are preferably used, for example, graphite, a net, a punching metal (foamed metals), a metal fiber net, and the like of platinum, gold, nickel, stainless steel, iron, copper or the like.

When the compounds having a N—F bond are moldable to a film-like material, like the case of comprising the compounds such as a polymer having a high molecular weight, or when the compounds become moldable to a film-like material with a film forming agent, they are made up into the film as they are or, if necessary, are blended with a binder and an electroconductive agent or additives mentioned hereinafter to be a film-like material which is then made up into a positive electrode in combination use with the current collector. As the film forming agent, preferable are, for example, polymeric materials such as poly(ethylene oxide), poly(ethylene), poly(tetrafluoroethylene), poly(vinylacetate), poly(acrylonitrile) and poly(methyl acrylate), or gelatine.

Also, the compounds may be used in the form of a mixture with other known active materials for the positive electrodes.
[Electrolyte]

As the electrolyte, any usual one can be used irrespective of liquid or solid. As the preferable liquid electrolyte, there are, for example, ethylene carbonate, propylene carbonate, sulfolane, γ-butyrolactone, 1,3-dioxolane, 2-methyltetrahydrofuran, diethyl ether, dimethoxyethane, and acetonitrile, in which lithium perchlorate, tetrabutylammonium perchlorate, lithium trifluoromethanesulfonate, lithium tetrafluoroborate, lithium hexafluoroantimonate, lithium hexafluoroarsenate, lithium hexafluorophosphate, lithium tetrachloroaluminium, zinc chloride, zinc fluoride, magnesium chloride, magnesium fluoride, ammonium fluoride, ammonium chloride, sodium perchlorate or the like is dissolved, and as the solid electrolytes, there are, for example, lithium trifluoromethanesulfonate, lithium tetrafluoroborate, lithium hexafluoroantimonate, lithium hexafluoroarsenate, lithium hexafluorophosphate, lithium perchlorate, magnesium trifluoromethanesulfonate, zinc tetrafluoroborate, $PbSnF_4$, $LaF_3$, $Pb_{0.9}Sn_{0.9}Zr_{0.2}F_{4.4}$, lithium trifluoromethanesulfonate/poly(ethylene oxide), lithium perchlorate/poly(propylene oxide).
[Negative electrode]

As the negative electrode, there can be used, for example, lithium, aluminium, zinc, lithium alloy, magnesium and copper which have been used conventionally.
[Separator]

When the separator is used, there can be adopted, for example, a woven fabric, a non-woven fabric, and the like of polyamide, polypropylene, or the like, which have been usually used.

The above-mentioned elements may be assembled into the battery in the usual manner. (2) When the compounds having a N—F bond of the present invention are used only for the solid electrolyte.
[Electrolyte]

Various forms of solid electrolyte can be made in the same manner as in the preparation of the positive electrode in the above (1) except that the electroconductive agent is not blended and the current collector is not used.
[Positive electrode]

There can be used usual active materials for the positive electrode. There are, for example, oxides such as $MnO_2$, $Ag_2CrO_4$, $SO_2$, $AgO$, $PbO_2$, $NiOOH$, $CuO_2$ and $V_2O_5$, simple substances such as $Cl_2$ and $Br_2$, and halogenides such as $SOCl_2$ and $SO_2Cl_2$. The positive electrodes are made in the usual manner.

[Negative electrodes]

Same as in (1) mentioned hereinabove.

[Separator]

A separator is principally not necessary. When the strength of the molded compounds having a N—F bond of the present invention is not sufficient or when there is a fear of stableness in a long term use, the separator referred to in (1) may be used.

The battery may be assembled in the usual manner by the use of the above-mentioned positive electrode, negative electrode and solid electrolyte, and the separator if necessary.

(3) When the compounds having a N—F bond of the present invention are used for the positive electrode which is used as both the active material for the positive electrode and the electrolyte.

[Preparation of the positive electrode used as both the active material for the positive electrode and the electrolyte]

When the same compounds having a N—F bond of the present invention are used, the positive electrode may be made in accordance with the manner mentioned in the above (1). In that case, because of the combined use as the active material for the positive electrode and the electrolyte, attention needs to be paid not to cause short circuit in case where the electroconductive agent is used. In case where the different compounds having a N—F bond of the present invention are used, the positive electrodes may be made in the manner of (1) or (2) mentioned above.

[Negative electrode]

Same as (1) mentioned above.

[Separator]

Since the interface between the electrolyte and the negative electrode of the present invention does not become under the short-circuit condition because of the formation of the protective film as mentioned above, the separator is principally not necessary. If necessary, the separator mentioned in (1) may be used.

The battery may be assembled in the manner as mentioned in (2) when the different kinds of the compounds having a N—F bond of the present invention are used as the electrolyte. When the compounds having a N—F bond of the present invention are used for the positive electrode employed as both the active material for the positive electrodes and the electrolyte, the battery may be assembled in the usual manner with the positive electrode being brought into contact directly with the negative electrode, and, if necessary, by the use of a separator.

In the cases of (2) and (3) mentioned above, because the battery can be of wholly solid type, there are many cases where it can be used even at a temperature of, for example, not less than 100° C. without leakage.

The battery having a low internal resistance can be also made by mixing 1 to 60% by weight, preferably, 1 to 50% by weight, more preferably 2 to 40% by weight of one or more of polar compounds into the compound having a N—F bond. As the polar compounds usable as the battery maintaining the characteristics of a wholly solid type battery in the cases where an added amount of the polar compound is small or the melting point thereof is higher than a normal temperature, there can be, for example, polar organic compounds such as dimethyl sulfone, dimethyl carbonate, diphenyl sulfone, methyl phenyl sulfone, 1,3-dioxolane, γ-butyrolactone, sulfolane, ethylene carbonate, propylene carbonate, tetraethylene glycol dimethyl ether, triethylene glycol dimethyl ether, diethylene glycol dimethyl ether, dimethoxyethane, ethylene glycol, ethanol, methanol, water, diethyl ether, tetrahydrofuran, 2-methyltetrahydrofuran, nitromethane, nitroethane, nitrobenzene, dinitrobenzene, acetonitrile, propionitrile and benzonitrile; and polar inorganic compounds such as lithium trifluoromethanesulfonate, lithium tetrafluoroborate, lithium hexafluorophosphate, lithium hexafluoroarsenate, lithium hexafluoroantimonate, lithium perchlorate, sodium perchlorate, potassium perchlorate, ammonium trifluoromethanesulfonate, ammonium tetrafluoroborate, ammonium chloride, sodium trifluoromethanesulfonate, potassium trifluoromethane-sulfonate, zinc trifluoromethanesulfonate, zinc tetrafluoroborate, magnesium trifluoromethanesulfonate and magnesium tetrafluoroborate.

The compounds having a N—F bond of the present invention, as mentioned above, are useful as materials for primary batteries, and can be expected to be used, for example, as materials for batteries such as those for energy storage, and as electrode materials and film materials for the other electrochemical sensors, chemical sensors, and the like.

In case of the use for batteries, it is possible to manufacture the batteries, making the best use of easy handling and the environmental acceptability of the compounds having a N—F bond. By selecting various kinds of the compounds having a N—F bond, a high electromotive force, high energy density, wide usable temperature range and long life time can be achieved. By further selecting the compounds having a N—F bond, a higher electromotive force or the desired electromotive force can be obtained, and the batteries complying with the applications can be made. Therefore, wide application can be expected as a series of the batteries only by changing the kind of the compounds having a N—F bond of the present invention without modifying the packages and the like. In case of the batteries using, as the positive electrode, the compounds having a N—F bond for both the active material for the positive electrode and the electrolyte, the structure of the batteries becomes simple, and so it is possible to achieve a small size and a light weight. It is also possible to make the batteries thinner by integration.

The compounds having a N—F bond of the present invention are explained by means of Examples, but the present invention is not limited thereto.

EXAMPLES 1 to 6

The oxidation potentials of the N-fluoropyridinium compounds shown in Table 1 were measured with a cyclic voltammetry by using the battery shown in FIG. 1 in the manner mentioned below.

A working electrode and a counter electrode were platinum, and a reference electrode was silver. The battery was charged with a solvent of 20 ml (2 ml for the standard electrode). Acetonitrile as the solvent was used after having been mixed with calcium hydroxide for 2 days and then refluxed and distilled. A silver nitrate and the N-fluoropyridinium used were subjected to dehydration by exhausting prior to the use. For the standard electrode, the acetonitrile solution was of 0.1M silver nitrate, the concentration of the N-fluoropyridinium compounds was 10 mM to prevent lowering of a voltage, and a concentration of lithium trifluoromethanesulfonate was 0.1M.

Lithium trifluoromethanesulfonate used as a supporting electrolyte was, because of its high hygroscopic property, subjected to deairing under heating after weighing. Furthermore with use of the anhydrous tetrahydrofuran, removal of water was carried out because of possible hydration with lithium trifluoromethanesulfonate. Since an electric potential at the reaction with water is close to the reduction potential of the N-fluoropyridinium compounds, the dehydration was thoroughly carried out. The platinum electrode was polished with a sand paper, washed with aqua regia and then rinsed with water before the use. The silver electrode was, after polished with a sand paper, washed with a mixture of methanol and nitric acid (9:1) and rinsed with water. All the batteries were dried with argon gas under heating with a hot air heater. Grease was used for the ground glass parts, and the battery assembling work was done under argon gas atmosphere in a glove box. Also, prior to the measurement, bubbling with argon gas was carried out for not less than 30 minutes inside the battery to be measured. The obtained Ep values (peak potential) are shown in Table 1. The values are shown with respect to those for saturated calomel electrode (SCE).

TABLE 1

| Example No. | N-fluoropyridinium compounds | Ep value (V) (for SCE) |
|---|---|---|
| 1 | CH$_3$ substituted pyridinium, $\ominus$OSO$_2$CF$_3$ | −0.37 |
| 2 | pyridinium, $\ominus$OSO$_2$CF$_3$ | −0.26 |
| 3 | pyridinium, $\ominus$BF$_4$ | −0.27 |
| 4 | Cl substituted pyridinium, $\ominus$OSO$_2$CF$_3$ | −0.06 |
| 5 | Cl substituted pyridinium, $\ominus$OSO$_2$CF$_3$ | +0.27 |
| 6 | Cl substituted pyridinium, $\ominus$OSO$_2$CF$_3$ | +0.37 |

As it can be seen from Table 1, the N-fluoropyridinium compound which was replaced by an electron donative group like methyl has a low electromotive force, while the N-fluoropyridinium compound which was replaced by an electron attractive group like chlorine atom generates a high electromotive force. Moreover, the electromotive force can be changed to a large extent by changing the position, quantity and kind of those substituents.

EXAMPLES 7 to 10

<Manufacture of a battery using compounds having a N—F bond—No. 1>

By using N-fluoropyridinium trifluoromethanesulfonate shown by the following formula:

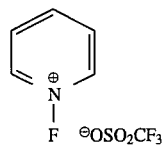

as the electrode material for both the active material for the positive electrode and the solid electrolyte, a wholly solid battery was made in the following manner. All the experiments were made at room temperature.

Figure 2:
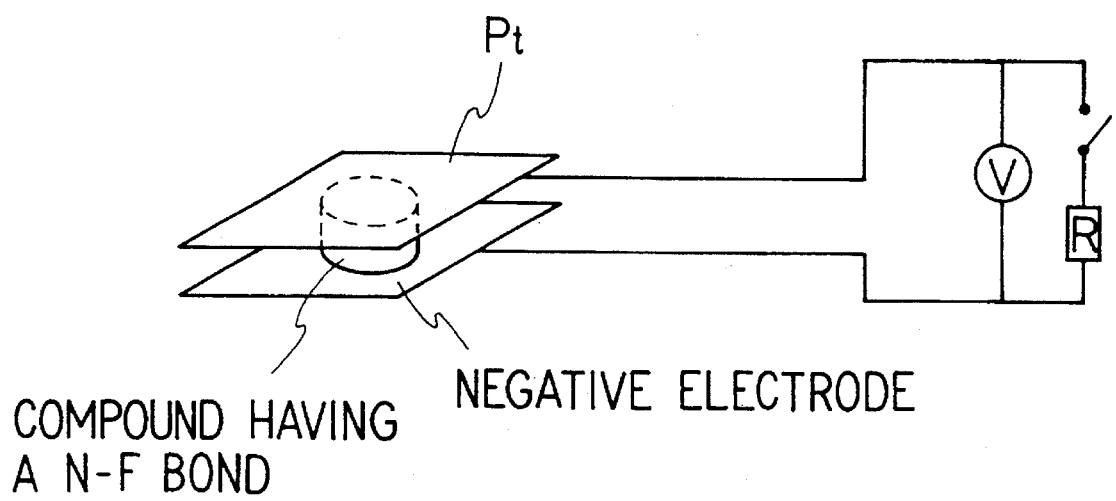
FIG. 2 is a schematic explanatory view of a measuring method of a wholly solid battery of the present invention, which was manufactured in Examples 7 to 16.

One fifty mg of N-fluoropyridinium trifluoromethanesulfonate was solidified by a manual pressing into a disc form of 7 mm diameter by 2 mm thick, and as shown in FIG. 2, was put between the platinum electrode and the negative electrode shown in Table 2. Thus the wholly solid battery was made, and an open circuit voltage was measured with a voltmeter. Measurements were made in natural atmosphere in case of Examples 7 to 9, and in an argon gas atmosphere in case of Example 10.

The results are shown in Table 2.

TABLE 2

| Example No. | Negative electrode | Open Circuit Voltage (V) |
|---|---|---|
| 7 | Copper | 0.6 |
| 8 | Zinc | 1.65 |
| 9 | Magnesium | 2.2 |
| 10 | Lithium | 2.9 |

Figure 3:
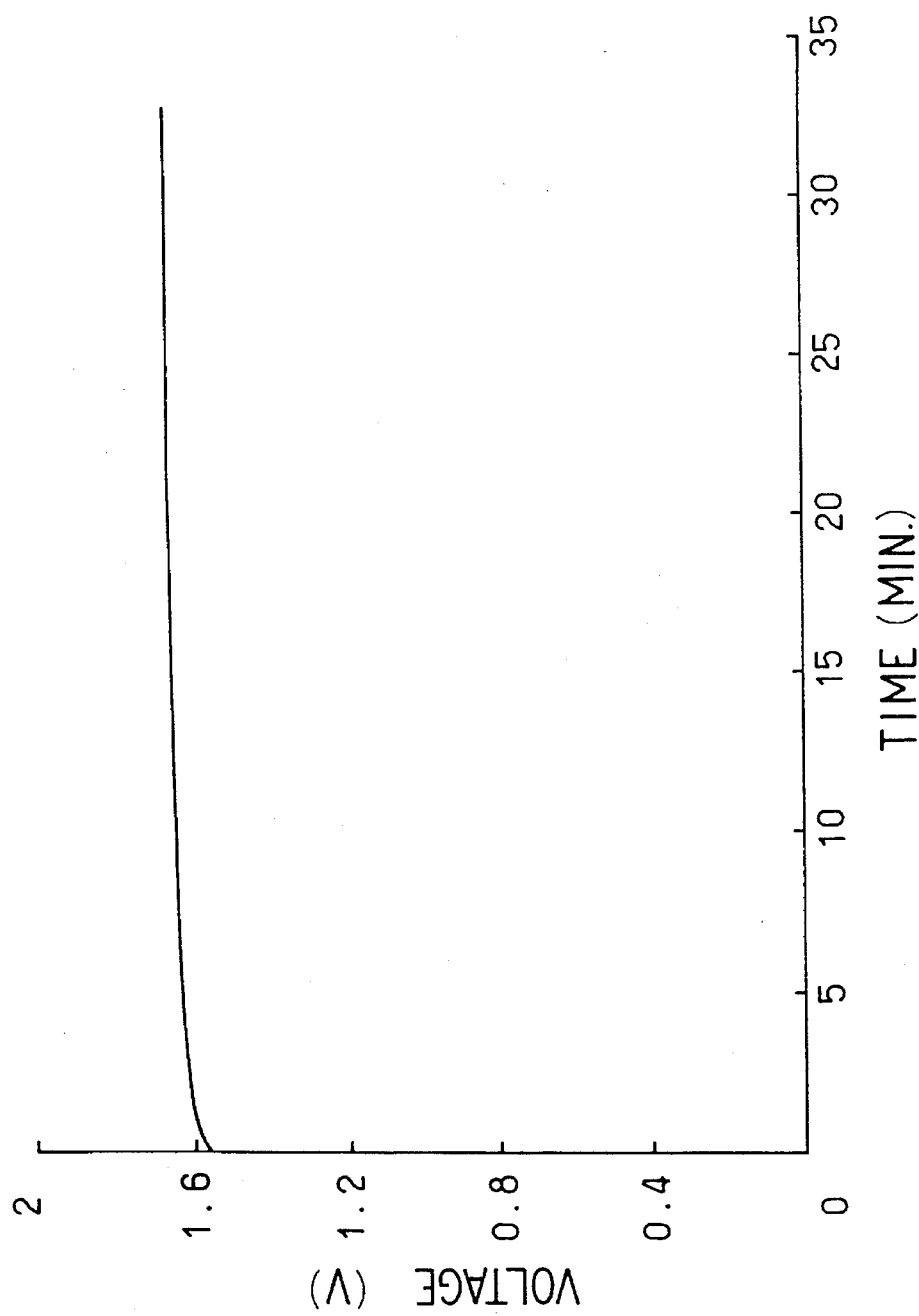
FIG. 3 is a graph showing variations with the laps of time in an electromotive force of a wholly solid battery of the present invention, which was manufactured in Example 8.

FIG. 3 shows variations with laps of time of the open circuit voltage in Example 8 using zinc for the negative electrode.

As it can be seen from Table 2, an electromotive force can be changed also by selecting the negative electrode. Also, it is explicit from FIG. 3 that the initial open circuit voltage is stable, and the batteries can be stored as wholly solid ones for a long period of time.

EXAMPLES 11 to 16

Open circuit voltages were measured in the same manner as in Example 8 except that in Example 8, the N-fluoropyridinium compounds shown in Table 3 were used instead of N-fluoropyridinium trifluoromethanesulfonate.

The results are shown in Table 3.

TABLE 3

| Example No. | N - fluoropyridinium compounds | Open circuit voltage (V) |
|---|---|---|
| 8 | pyridinium, $\ominus$OSO$_2$CF$_3$ | 1.65 |

TABLE 3-continued

| Example No. | N-fluoropyridinium compounds | Open circuit voltage (V) |
|---|---|---|
| 11 | 4-CH₃, 2,6-(CH₃)₂ pyridinium, N–F, ⁻OSO₂CF₃ | 0.15 |
| 12 | 3,5-Cl₂ pyridinium, N–F, ⁻OSO₂CF₃ | 1.67 |
| 13 | 2,6-Cl₂ pyridinium, N–F, ⁻OSO₂CF₃ | 1.86 |
| 14 | 2,3,4,5,6-Cl₅ pyridinium, N–F, ⁻OSO₂CF₃ | 1.89 |
| 15 | pyridinium, N–F, ⁻BF₄ | 1.2~1.4 |
| 16 | 2-CF₃, 6-SO₃⁻ pyridinium, N–F | 1.60 |

EXAMPLE 17

The battery (using N-fluoropyridinium trifluoromethanesulfonate) of Example 8, which was made by using zinc for the negative electrode, was made up into a closed circuit with the switch shown in FIG. 2, and the voltages in 1 second after various loads as shown in Table 4 were applied were measured.

The results are given in Table 4.

TABLE 4

| Load (kΩ) | Voltage (V) |
|---|---|
| 0 | 1.65 |
| 1000 | 1.32 |
| 110 | 0.97 |
| 50 | 0.77 |
| 10 | 0.30 |

It is clear from the Table 4 that the N-fluoropyridinium compounds of the present invention are useful as new material for actually generating an energy such as electricity.

EXAMPLES 18 to 170

<Manufacture of batteries using the compounds having a N—F bond—No. 2>

About 120 mg of the compounds having a N—F bond shown in Table 5, which was fully crushed in a mortar, or about 120 mg of the compounds having a N—F bond, which was fully mixed with additives in a mortar at the given ratio to the weight of the compounds having a N—F bond as shown in Table 5, were spread thinly over a 1 cm×1 cm metal plate such as a platinum plate and a gold plate, which would be a current collector at the positive electrode side. The opposite side was pressed down with a fluoro-resin sheet, and was kept pressed for 10 minutes by the pressure (ton/cm²) shown in the Table with a press. Thus the solid molded article containing the compounds having a N—F bond could be formed, and the thickness thereof was about 100 μm. Then the fluoro-resin sheet was removed, and replaced by a metal plate such as zinc, magnesium or lithium, which would become an active material for the negative electrode to measure its open circuit voltage and internal resistance. The pressing was all carried out in natural atmosphere. Assembling of the battery and the measurement were carried out in natural atmosphere when the negative electrode was zinc or magnesium, and in an argon gas atmosphere when the negative electrode was lithium. In case of N-fluoro-3,5-dichloropyridinium trifluoromethanesulfonate, N-fluoro-3,5-dichloropyridinium tetrafluoroborate, N-fluoro-2,6-dichloropyridinium trifluoromethanesulfonate, N-fluoro-2,6-dichloropyridinium tetrafluoroborate, N-fluoro-2,3,4,5,6-pentachloropyridinium trifluoromethanesulfonate and N-fluoro-2,3,4,5,6-pentachloropyridinium tetrafluoroborate, assembling of the battery and the measurement were carried out in an argon gas atmosphere irrespective of the kind of metal of the negative electrode.

Figure 4:
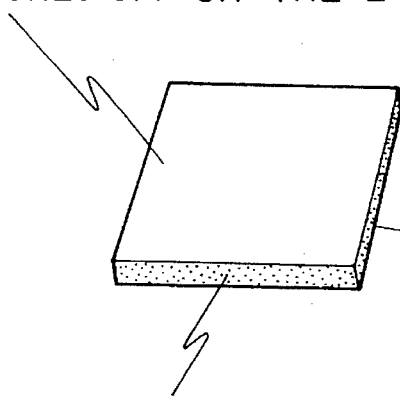
FIG. 4 is a perspective view of a battery manufactured in Examples 18 to 170 and 190 to 205.

FIG. 4 shows a perspective view of the batteries manufactured. Also the open circuit voltages of those batteries were measured, and then with the same meter as in FIG. 2, the open circuit voltages and the battery voltages under the external load of from 1MΩ to 10MΩ were measured to calculate the internal resistance. The battery voltage when the external resistance was applied was measured when it became a fixed value or nearly a fixed value (when it became stable at about ±0.01 V). The results are shown in Table 5.

The N-fluoropyridinium pyridine heptafluorodiborate, which was the compound having a N—F bond and was used in Examples 149 to 154, was the one purchased from Allied Signal Inc.

Also, the compound poly(2-vinyl-N-fluoropyridinium trifluoromethanesulfonate) having a N—F bond, which was used in Examples 165 to 170, was the one synthesized by using poly(2-vinylpyridine) having an average molecular weight of 200000. The synthetic method used was the one for the N-fluoropyridinium trifluoromethanesulfonate (cf. Bull. Chem. Soc. Jpn., 64, 1081(1991)). The obtained poly(2-vinyl-N-fluoropyridinium trifluoromethanesulfonate) contained about 15% by weight of 2-vinyl-N-hydropyridinium trifluoromethanesulfonate unit:

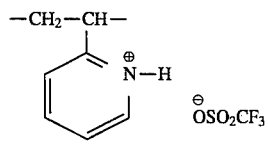

which was not the desired compound, as a result of an analysis of ¹⁹F— and ¹H-NMR spectra.

TABLE 5

| Example No. | Positive electrode (Compounds having a N—F bond) | Current collector | Negative electrode | Pressure (ton/cm²) | Additive | Open circuit voltage | Internal resistance |
|---|---|---|---|---|---|---|---|
| 18 | pyridinium-N-F $^{\oplus}$ $^{\ominus}BF_4$ | Pt | Zn | 0.5 | Non | 1.6 V | >1 MΩ |
| 19 | pyridinium-N-F $^{\oplus}$ $^{\ominus}BF_4$ | Pt | Zn | 1 | Non | 1.6 V | >1 MΩ |
| 20 | pyridinium-N-F $^{\oplus}$ $^{\ominus}BF_4$ | Pt | Zn | 2 | Non | 1.6 V | >1 MΩ |
| 21 | pyridinium-N-F $^{\oplus}$ $^{\ominus}BF_4$ | Pt | Mg | 0.5 | Non | 2.3 V | 59 KΩ |
| 22 | pyridinium-N-F $^{\oplus}$ $^{\ominus}BF_4$ | Pt | Mg | 1 | Non | 2.4 V | 117 kΩ |
| 21 | pyridinium-N-F $^{\oplus}$ $^{\ominus}BF_4$ | Pt | Mg | 2 | Non | 2.5 V | 313 kΩ |
| 22 | pyridinium-N-F $^{\oplus}$ $^{\ominus}BF_4$ | Pt | Mg | 1 | Sulfolane (9% by weight) | 2.3 V | 5.3 kΩ |
| 23 | pyridinium-N-F $^{\oplus}$ $^{\ominus}BF_4$ | Pt | Mg | 1 | Sulfolane (17% by weight) | 2.1 V | 3.7 kΩ |
| 24 | pyridinium-N-F $^{\oplus}$ $^{\ominus}BF_4$ | Pt | Li | 1 | Non | 3.8 V | >1 MΩ |
| 25 | pyridinium-N-F $^{\oplus}$ $^{\ominus}BF_4$ | Pt | Li | 1 | Sulfolane (6% by weight) | 3.7 V | 7.9 kΩ |

TABLE 5-continued

| Example No. | Positive electrode (Compounds having a N—F bond) | Current collector | Negative electrode | Pressure (ton/cm²) | Additive | Open circuit voltage | Internal resistance |
|---|---|---|---|---|---|---|---|
| 26 | 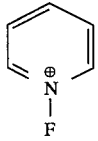 ⊖BF₄ | Pt | Li | 1 | Sulfolane (9% by weight) | 3.6 V | 5.8 kΩ |
| 27 | 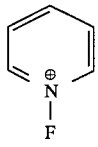 ⊖BF₄ | Pt | Li | 1 | Sulfolane (17% by weight) | 3.6 V | 4.1 kΩ |
| 28 | 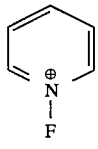 ⊖BF₄ | Pt | Li | 1 | Diphenyl sulfone (6% by weight) | 3.7 V | >1 MΩ |
| 29 | 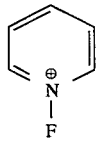 ⊖BF₄ | Pt | Li | 1 | Diphenyl sulfone (9% by weight) | 3.4 V | >1 MΩ |
| 30 | 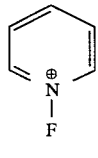 ⊖BF₄ | Pt | Li | 1 | Diphenyl sulfone (17% by weight) | 3.1 V | >1 MΩ |
| 31 | 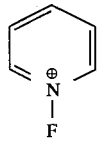 ⊖BF₄ | Pt | Li | 1 | Methyl phenyl sulfone (6% by weight) | 3.5 V | >1 MΩ |
| 32 | 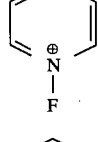 ⊖BF₄ | Pt | Li | 1 | Methyl phenyl sulfone (9% by weight) | 3.6 V | >1 MΩ |
| 33 | 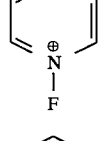 ⊖BF₄ | Pt | Li | 1 | Methyl phenyl sulfone (17% by weight) | 3.7 V | >1 MΩ |
| 34 | 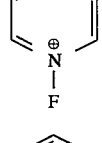 ⊖BF₄ | Pt | Li | 1 | Dimethylsulfone (9% by weight) | 3.9 V | >1 MΩ |
| 35 | 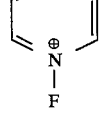 ⊖BF₄ | Pt | Li | 1 | 1,3 - dioxolane (9% by weight) | 3.8 V | >1 MΩ |

TABLE 5-continued

| Example No. | Positive electrode (Compounds having a N—F bond) | Current collector | Negative electrode | Pressure (ton/cm$^2$) | Additive | Open circuit voltage | Internal resistance |
|---|---|---|---|---|---|---|---|
| 36 | pyridinium-F $^{\ominus}$BF$_4$ | Pt | Li | 1 | γ-butyrolactone (9% by weight) | 3.8 V | 23 kΩ |
| 37 | pyridinium-F $^{\ominus}$BF$_4$ | Pt | Li | 1 | Ethylene carbonate (9% by weight) | 3.6 V | 5.2 kΩ |
| 38 | pyridinium-F $^{\ominus}$BF$_4$ | Pt | Li | 1 | Dimethyl catbonate (9% by weight) | 3.8 V | >1 MΩ |
| 39 | pyridinium-F $^{\ominus}$BF$_4$ | Pt | Li | 1 | Propylene carbonate (6% by weight) | 3.7 V | 63 kΩ |
| 40 | pyridinium-F $^{\ominus}$BF$_4$ | Pt | Li | 1 | Tetraethylene glycol dimethyl ether (2% by weight) | 3.7 V | 63 kΩ |
| 41 | pyridinium-F $^{\ominus}$BF$_4$ | Pt | Li | 1 | Tetraethylene glycol dimethyl ether (6% by weight) | 3.9 V | 46 kΩ |
| 42 | pyridinium-F $^{\ominus}$BF$_4$ | Pt | Li | 1 | Tetraethylene glycol dimethyl ether (9% by weight) | 3.8 V | 33 kΩ |
| 43 | pyridinium-F $^{\ominus}$BF$_4$ | Pt | Li | 1 | Tetraethylene glycol dimethyl ether (17% by weight) | 3.7 V | 29 kΩ |
| 44 | pyridinium-F $^{\ominus}$BF$_4$ | Pt | Li | 1 | LiOSO$_2$CF$_3$ (5% by weight) | 3.9 V | 258 kΩ |
| 45 | pyridinium-F $^{\ominus}$BF$_4$ | Pt | Li | 1 | LiOSO$_2$CF$_3$ (5% by weight) Sulfolane (9% by weight) | 3.7 V | 18 kΩ |

TABLE 5-continued

| Example No. | Positive electrode (Compounds having a N—F bond) | Current collector | Negative electrode | Pressure (ton/cm²) | Additive | Open circuit voltage | Internal resistance |
|---|---|---|---|---|---|---|---|
| 46 | 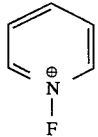 pyridinium-F ⊖BF₄ | Pt | Al | 1 | Non | 1.3 V | 880 kΩ |
| 47 | 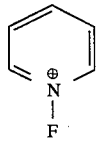 pyridinium-F ⊖BF₄ | Pt | Al | 1 | Sulfolane (9% by weight) | 1.7 V | 17 kΩ |
| 48 | 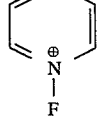 pyridinium-F ⊖BF₄ | Pt | Al | 1 | Sulfolane (17% by weight) | 1.2 V | 69 kΩ |
| 49 | 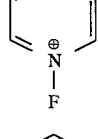 pyridinium-F ⊖BF₄ | Au | Li | 1 | Sulfolane (9% by weight) | 3.6 V | 8.8 kΩ |
| 50 | 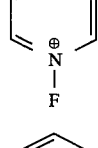 pyridinium-F ⊖BF₄ | Ni | Li | 1 | Sulfolane (6% by weight) | 3.1 V | 11 kΩ |
| 51 | 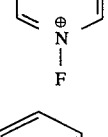 pyridinium-F ⊖BF₄ | Ag | Li | 1 | Sulfolane (9% by weight) | 3.0 V | 8.7 kΩ |
| 52 | 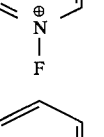 pyridinium-F ⊖OSO₂CF₃ | Pt | Zn | 0.5 | Non | 1.5 V | 545 kΩ |
| 53 | 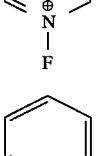 pyridinium-F ⊖OSO₂CF₃ | Pt | Zn | 1 | Non | 1.5 V | 39 kΩ |
| 54 | 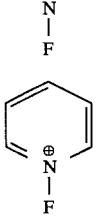 pyridinium-F ⊖OSO₂CF₃ | Pt | Zn | 2 | Non | 1.5 V | 3.5 kΩ |
| 55 |  pyridinium-F ⊖OSO₂CF₃ | Pt | Zn | 6 | Non | 1.6 V | 24 kΩ |

TABLE 5-continued

| Example No. | Positive electrode (Compounds having a N—F bond) | Current collector | Negative electrode | Pressure (ton/cm²) | Additive | Open circuit voltage | Internal resistance |
|---|---|---|---|---|---|---|---|
| 56 |  ⊖OSO₂CF₃ | Pt | Mg | 0.5 | Non | 1.9 V | 15 kΩ |
| 57 |  ⊖OSO₂CF₃ | Pt | Mg | 1 | Non | 2.2 V | 30 kΩ |
| 58 |  ⊖OSO₂CF₃ | Pt | Mg | 2 | Non | 2.2 V | 25 kΩ |
| 59 |  ⊖OSO₂CF₃ | Pt | Mg | 6 | Non | 2.2 V | 18 kΩ |
| 60 |  ⊖OSO₂CF₃ | Pt | Li | 1 | Non | 3.7 V | >1 MΩ |
| 61 |  ⊖OSO₂CF₃ | Pt | Li | 1 | Sulfolane | 3.7 V | 17 kΩ |
| 62 |  ⊖OSO₂CF₃ | Pt | Li | 1 | Sulfolane ethylene carbonate | 3.2 V | 53 kΩ |
| 63 |  ⊖OSO₂CF₃ | Pt | Li | 1 | LiOSO₂CF₃ (5% by weight) | 3.8 V | >1 MΩ |
| 64 |  ⊖PF₆ | Pt | Li | 1 | Non | 3.8 V | >1 MΩ |
| 65 |  ⊖BF₄ | Pt | Mg | 0.5 | Non | 1.8 V | >1 MΩ |

TABLE 5-continued

| Example No. | Positive electrode (Compounds having a N—F bond) | Current collector | Negative electrode | Pressure (ton/cm²) | Additive | Open circuit voltage | Internal resistance |
|---|---|---|---|---|---|---|---|
| 66 | 2,4,6-trimethyl-N-fluoropyridinium BF₄⁻ 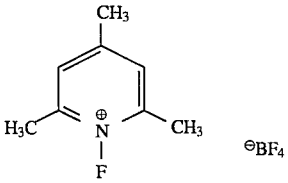 | Pt | Mg | 1 | Non | 2.3 V | >1 MΩ |
| 67 | 2,4,6-trimethyl-N-fluoropyridinium BF₄⁻ 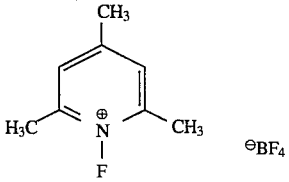 | Pt | Mg | 2 | Non | 2.3 V | >1 MΩ |
| 68 | 2,4,6-trimethyl-N-fluoropyridinium OSO₂CF₃⁻ 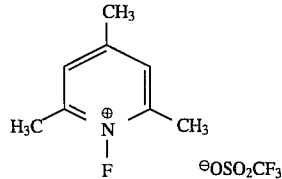 | Pt | Zn | 0.5 | Non | 1.1 V | >1 MΩ |
| 69 | 2,4,6-trimethyl-N-fluoropyridinium OSO₂CF₃⁻ 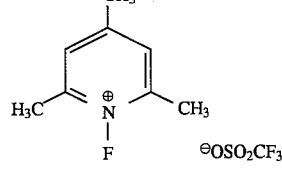 | Pt | Zn | 1 | Non | 1.2 V | 770 kΩ |
| 70 | 2,4,6-trimethyl-N-fluoropyridinium OSO₂CF₃⁻ 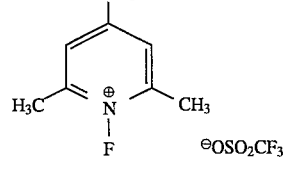 | Pt | Zn | 2 | Non | 1.2 V | >1 MΩ |
| 71 | 2,4,6-trimethyl-N-fluoropyridinium OSO₂CF₃⁻ 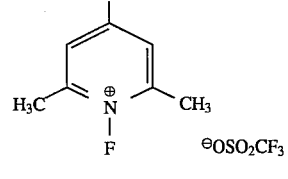 | Pt | Mg | 0.5 | Non | 2.1 V | >1 MΩ |
| 72 | 2,4,6-trimethyl-N-fluoropyridinium OSO₂CF₃⁻ 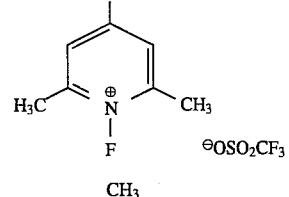 | Pt | Mg | 1 | Non | 2.1 V | >1 MΩ |
| 73 | 2,4,6-trimethyl-N-fluoropyridinium OSO₂CF₃⁻ 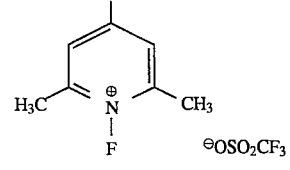 | Pt | Mg | 2 | Non | 2.1 V | >1 MΩ |

TABLE 5-continued
| Example No. | Positive electrode (Compounds having a N—F bond) | Current collector | Negative electrode | Pressure (ton/cm$^2$) | Additive | Open circuit voltage | Internal resistance |
|---|---|---|---|---|---|---|---|
| 74 | 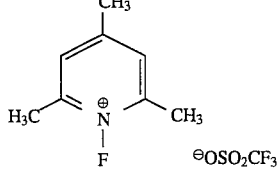 | Pt | Li | 1 | Sulfolane | 3.2 V | 15 kΩ |
| 75 | 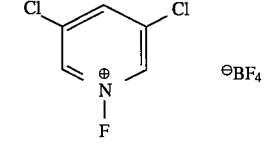 | Pt | Mg | 0.5 | Non | 2.7 V | >1 MΩ |
| 76 | 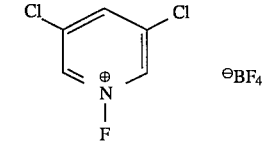 | Pt | Mg | 1 | Non | 2.3 V | >1 MΩ |
| 77 | 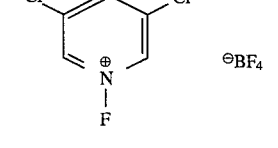 | Pt | Mg | 2 | Non | 2.6 V | >1 MΩ |
| 78 | 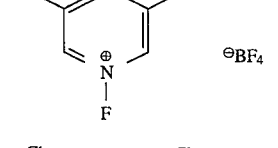 | Pt | Li | 1 | Sulfolane (6% by weight) | 3.8 V | 2.4 kΩ |
| 79 | 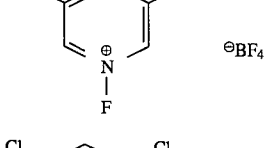 | Ni | Li | 1 | Sulfolane (9% by weight) | 3.3 V | 4.9 kΩ |
| 80 | 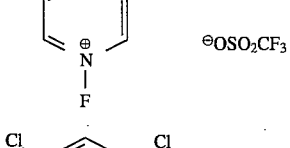 | Pt | Zn | 0.5 | Non | 1.6 V | 541 kΩ |
| 81 | 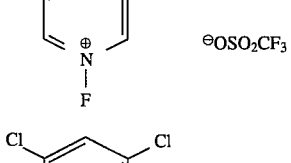 | Pt | Zn | 1 | Non | 1.6 V | 148 kΩ |
| 82 | 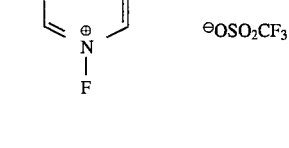 | Pt | Zn | 2 | Non | 1.6 V | 489 kΩ |

TABLE 5-continued

| Example No. | Positive electrode (Compounds having a N—F bond) | Current collector | Negative electrode | Pressure (ton/cm²) | Additive | Open circuit voltage | Internal resistance |
|---|---|---|---|---|---|---|---|
| 83 | 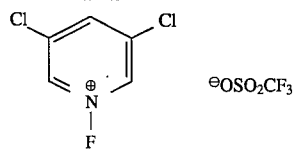 3,5-dichloro-N-fluoropyridinium ⊖OSO₂CF₃ | Pt | Mg | 0.5 | Non | 2.3 V | 725 kΩ |
| 84 | 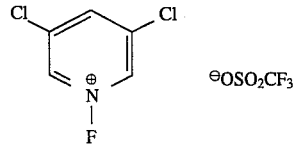 3,5-dichloro-N-fluoropyridinium ⊖OSO₂CF₃ | Pt | Mg | 1 | Non | 2.4 V | 837 kΩ |
| 85 | 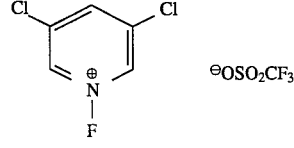 3,5-dichloro-N-fluoropyridinium ⊖OSO₂CF₃ | Pt | Mg | 2 | Non | 2.3 V | >1 MΩ |
| 86 | 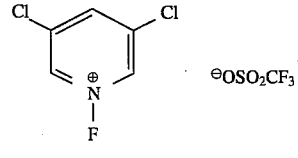 3,5-dichloro-N-fluoropyridinium ⊖OSO₂CF₃ | Pt | Li | 1 | Non | 4.0 V | >1 MΩ |
| 87 | 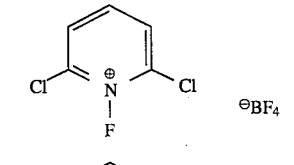 2,6-dichloro-N-fluoropyridinium ⊖BF₄ | Pt | Zn | 0.5 | Non | 1.6 V | >1 MΩ |
| 88 | 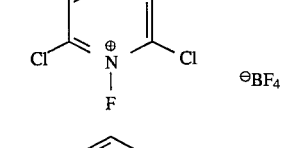 2,6-dichloro-N-fluoropyridinium ⊖BF₄ | Pt | Zn | 1 | Non | 1.3 V | >1 MΩ |
| 89 | 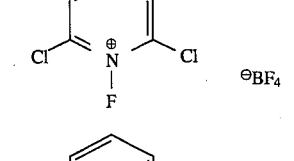 2,6-dichloro-N-fluoropyridinium ⊖BF₄ | Pt | Zn | 2 | Non | 1.6 V | >1 MΩ |
| 90 | 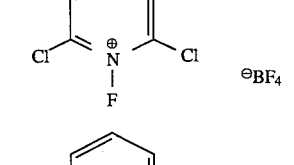 2,6-dichloro-N-fluoropyridinium ⊖BF₄ | Pt | Mg | 0.5 | Non | 2.5 V | >1 MΩ |
| 91 | 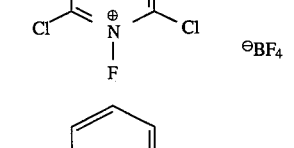 2,6-dichloro-N-fluoropyridinium ⊖BF₄ | Pt | Mg | 1 | Non | 2.6 V | >1 MΩ |
| 92 | 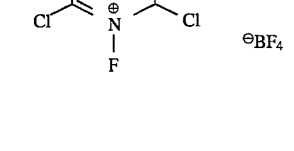 2,6-dichloro-N-fluoropyridinium ⊖BF₄ | Pt | Mg | 2 | Non | 2.4 V | >1 MΩ |

TABLE 5-continued

| Example No. | Positive electrode (Compounds having a N—F bond) | Current collector | Negative electrode | Pressure (ton/cm$^2$) | Additive | Open circuit voltage | Internal resistance |
|---|---|---|---|---|---|---|---|
| 93 | 2,6-dichloro-N-fluoropyridinium $^\ominus$BF$_4$ | Pt | Li | 1 | Non | 4.1 V | >1 MΩ |
| 94 | 2,6-dichloro-N-fluoropyridinium $^\ominus$BF$_4$ | Pt | Li | 1 | Sulfolane (9% by weight) | 4.2 V | 13 kΩ |
| 95 | 2,6-dichloro-N-fluoropyridinium $^\ominus$BF$_4$ | Pt | Li | 1 | LiOSO$_2$CF$_3$ (5% by weight) | 4.1 V | >1 MΩ |
| 96 | 2,6-dichloro-N-fluoropyridinium $^\ominus$BF$_4$ | Pt | Li | 1 | LiOSO$_2$CF$_3$ (5% by weight) Sulfolane (9% by weight) | 4.2 V | 33 kΩ |
| 97 | 2,6-dichloro-N-fluoropyridinium $^\ominus$BF$_4$ | Au | Li | 1 | Sulfolane (9% by weight) | 4.0 V | 7.7 kΩ |
| 98 | 2,6-dichloro-N-fluoropyridinium $^\ominus$BF$_4$ | Ag | Li | 1 | Sulfolane (9% by weight) | 3.7 V | 6.2 kΩ |
| 99 | 2,6-dichloro-N-fluoropyridinium $^\ominus$BF$_4$ | Ni | Li | 1 | Sulfolane (9% by weight) | 3.2 V | 36 kΩ |
| 100 | 2,6-dichloro-N-fluoropyridinium $^\ominus$BF$_4$ | Au | Li | 1 | Non | 3.9 V | >1 MΩ |
| 101 | 2,6-dichloro-N-fluoropyridinium $^\ominus$OSO$_2$CF$_3$ | Pt | Zn | 0.5 | Non | 1.8 V | >1 MΩ |
| 102 | 2,6-dichloro-N-fluoropyridinium $^\ominus$OSO$_2$CF$_3$ | Pt | Zn | 1 | Non | 1.8 V | >1 MΩ |

TABLE 5-continued
| Example No. | Positive electrode (Compounds having a N—F bond) | Current collector | Negative electrode | Pressure (ton/cm²) | Additive | Open circuit voltage | Internal resistance |
|---|---|---|---|---|---|---|---|
| 103 | 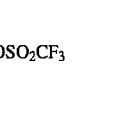 | Pt | Zn | 2 | Non | 1.9 V | >1 MΩ |
| 104 | 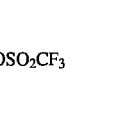 | Pt | Mg | 0.5 | Non | 2.6 V | >1 MΩ |
| 105 | 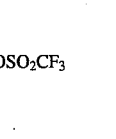 | Pt | Mg | 1 | Non | 2.5 V | >1 MΩ |
| 106 | 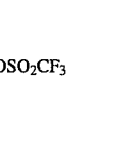 | Pt | Mg | 2 | Non | 2.6 V | >1 MΩ |
| 107 | 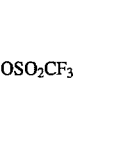 | Pt | Li | 1 | Non | 4.2 V | >1 MΩ |
| 108 | 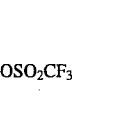 | Pt | Li | 1 | LiOSO$_2$CF$_3$ (5% by weight) | 4.2 V | >1 MΩ |
| 109 | 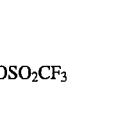 | Pt | Mg | 1 | Sulfolane (9% by weight) | 2.5 V | 13 kΩ |
| 110 | 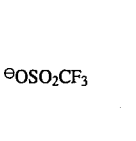 | Pt | Mg | 1 | Sulfolane (9% by weight) | 2.4 V | 42 kΩ |
| 111 |  | Pt | Mg | 1 | Non | 2.8 V | 117 kΩ |

TABLE 5-continued

| Example No. | Positive electrode (Compounds having a N—F bond) | Current collector | Negative electrode | Pressure (ton/cm$^2$) | Additive | Open circuit voltage | Internal resistance |
|---|---|---|---|---|---|---|---|
| 112 | pentachloropyridinium-F $^\oplus$ $^\ominus$BF$_4$ | Pt | Mg | 1 | Sulfolane (9% by weight) | 2.8 V | 8.5 kΩ |
| 113 | pentachloropyridinium-F $^\oplus$ $^\ominus$BF$_4$ | Pt | Mg | 1 | Sulfolane (17% by weight) | 2.5 V | 29 kΩ |
| 114 | pentachloropyridinium-F $^\oplus$ $^\ominus$BF$_4$ | Pt | Li | 1 | Non | 4.4 V | >1 MΩ |
| 115 | pentachloropyridinium-F $^\oplus$ $^\ominus$BF$_4$ | Pt | Li | 1 | Sulfolane (9% by weight) | 4.1 V | 11 MΩ |
| 116 | pentachloropyridinium-F $^\oplus$ $^\ominus$BF$_4$ | Au | Li | 1 | Sulfolane (12% by weight) | 3.9 V | 154 kΩ |
| 117 | pentachloropyridinium-F $^\oplus$ $^\ominus$BF$_4$ | Ag | Li | 1 | Sulfolane (9% by weight) | 3.5 V | 7.3 kΩ |
| 118 | pentachloropyridinium-F $^\oplus$ $^\ominus$BF$_4$ | Ni | Li | 1 | Sulfolane (9% by weight) | 3.0 V | 27 kΩ |
| 119 | pentachloropyridinium-F $^\oplus$ $^\ominus$BF$_4$ | Au | Li | 1 | Non | 4.3 V | >1 MΩ |

TABLE 5-continued

| Example No. | Positive electrode (Compounds having a N—F bond) | Current collector | Negative electrode | Pressure (ton/cm$^2$) | Additive | Open circuit voltage | Internal resistance |
|---|---|---|---|---|---|---|---|
| 120 | pentachloro-N-fluoropyridinium $BF_4^-$ | Au | Li | 1 | Sulfolane (9% by weight) | 4.0 V | 6.6 kΩ |
| 121 | pentachloro-N-fluoropyridinium $BF_4^-$ | Pt | Li | 1 | LiOSO$_2$CF$_3$ (5% by weight) | 4.3 V | >1 MΩ |
| 122 | pentachloro-N-fluoropyridinium $BF_4^-$ | Pt | Li | 1 | LiOSO$_2$CF$_3$ (5% by weight) Sulfolane (9% by weight) | 4.2 V | 9.2 kΩ |
| 123 | pentachloro-N-fluoropyridinium $OSO_2CF_3^-$ | Pt | Zn | 0.5 | Non | 2.0 V | >1 MΩ |
| 124 | pentachloro-N-fluoropyridinium $OSO_2CF_3^-$ | Pt | Zn | 1 | Non | 1.9 V | 942 kΩ |
| 125 | pentachloro-N-fluoropyridinium $OSO_2CF_3^-$ | Pt | Zn | 2 | Non | 1.9 V | >1 MΩ |
| 126 | pentachloro-N-fluoropyridinium $OSO_2CF_3^-$ | Pt | Mg | 0.5 | Non | 2.8 V | 802 kΩ |
| 127 | pentachloro-N-fluoropyridinium $OSO_2CF_3^-$ | Pt | Mg | 1 | Non | 2.8 V | >1 MΩ |

TABLE 5-continued

| Example No. | Positive electrode (Compounds having a N—F bond) | Current collector | Negative electrode | Pressure (ton/cm²) | Additive | Open circuit voltage | Internal resistance |
|---|---|---|---|---|---|---|---|
| 128 | 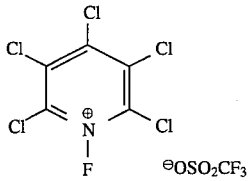 | Pt | Mg | 2 | Non | 2.8 V | >1 MΩ |
| 129 | 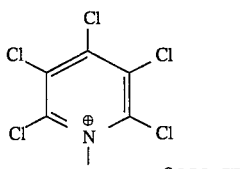 | Pt | Li | 1 | Non | 4.3 V | >1 MΩ |
| 130 | 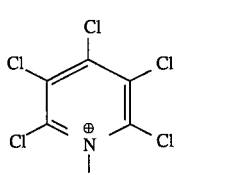 | Au | Li | 1 | Tetraethylene glycol dimethyl ether | 3.9 V | 2.2 kΩ |
| 131 | 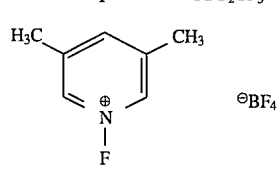 | Pt | Li | 1 | Non | 3.8 V | >1 MΩ |
| 132 | 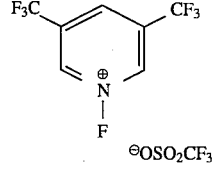 | Pt | Li | 1 | Non | 4.0 V | >1 MΩ |
| 133 | 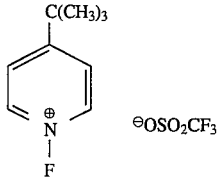 | Pt | Li | 1 | Non | 3.7 V | >1 MΩ |
| 134 | 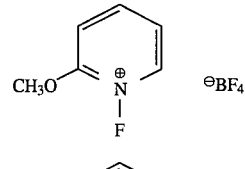 | Pt | Li | 1 | Non | 4.0 V | 38 kΩ |
| 135 | 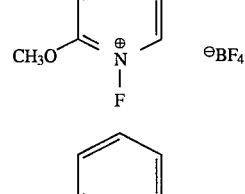 | Pt | Li | 1 | Sulfolane (5% by weight) | 3.8 V | 59 kΩ |
| 136 | 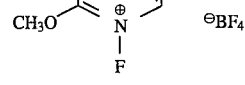 | Pt | Li | 1 | Sulfolane (17% by weight) | 3.5 V | 5.8 kΩ |

TABLE 5-continued

| Example No. | Positive electrode (Compounds having a N—F bond) | Current collector | Negative electrode | Pressure (ton/cm²) | Additive | Open circuit voltage | Internal resistance |
|---|---|---|---|---|---|---|---|
| 137 | 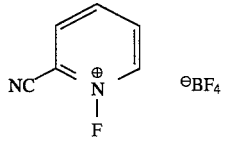 NC–[N⁺–F] ⊖BF₄ | Pt | Li | 1 | Non | 4.1 V | 346 kΩ |
| 138 | 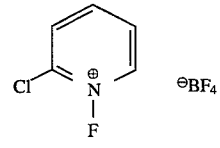 Cl–[N⁺–F] ⊖BF₄ | Pt | Li | 1 | Non | 4.0 V | 810 kΩ |
| 139 | 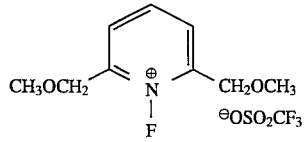 CH₃OCH₂–[N⁺–F]–CH₂OCH₃ ⊖OSO₂CF₃ | Pt | Li | 1 | Non | 4.0 V | 59 kΩ |
| 140 | 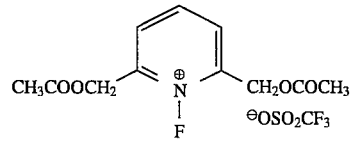 CH₃COOCH₂–[N⁺–F]–CH₂OCOCH₃ ⊖OSO₂CF₃ | Pt | Li | 1 | Non | 4.0 V | 23 kΩ |
| 141 | 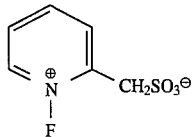 [N⁺–F]–CH₂SO₃⊖ | Pt | Li | 1 | Non | 3.5 V | >1 MΩ |
| 142 | 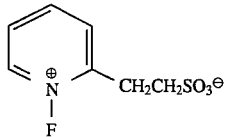 [N⁺–F]–CH₂CH₂SO₃⊖ | Pt | Li | 1 | Non | 3.9 V | >1 MΩ |
| 143 | 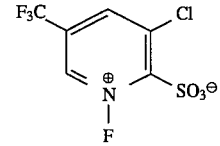 F₃C–[pyridinium with Cl, N⁺–F, SO₃⊖] | Pt | Zn | 0.5 | Non | 1.3 V | 6.4 kΩ |
| 144 | 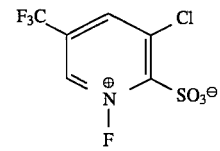 F₃C–[pyridinium with Cl, N⁺–F, SO₃⊖] | Pt | Zn | 1 | Non | 1.4 V | 10 kΩ |
| 145 | 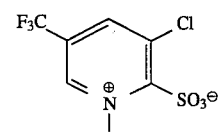 F₃C–[pyridinium with Cl, N⁺–F, SO₃⊖] | Pt | Zn | 2 | Non | 1.4 V | 16 kΩ |
| 146 | 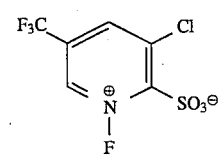 F₃C–[pyridinium with Cl, N⁺–F, SO₃⊖] | Pt | Mg | 0.5 | Non | 2.0 V | 22 kΩ |

TABLE 5-continued

| Example No. | Positive electrode (Compounds having a N—F bond) | Current collector | Negative electrode | Pressure (ton/cm$^2$) | Additive | Open circuit voltage | Internal resistance |
|---|---|---|---|---|---|---|---|
| 147 | F$_3$C-, Cl, SO$_3^\ominus$ pyridinium-F | Pt | Mg | 1 | Non | 1.8 V | 19 kΩ |
| 148 | F$_3$C-, Cl, SO$_3^\ominus$ pyridinium-F | Pt | Mg | 2 | Non | 1.7 V | 6.6 kΩ |
| 149 | pyridinium-F · pyridine · B$_2$F$_7^\ominus$ | Pt | Zn | 0.5 | Non | 1.5 V | >1 MΩ |
| 150 | pyridinium-F · pyridine · B$_2$F$_7^\ominus$ | Pt | Zn | 1 | Non | 1.3 V | >1 MΩ |
| 151 | pyridinium-F · pyridine · B$_2$F$_7^\ominus$ | Pt | Zn | 2 | Non | 1.3 V | >1 MΩ |
| 152 | pyridinium-F · pyridine · B$_2$F$_7^\ominus$ | Pt | Mg | 0.5 | Non | 1.9 V | 8.1 kΩ |
| 153 | pyridinium-F · pyridine · B$_2$F$_7^\ominus$ | Pt | Mg | 1 | Non | 1.7 V | 20 kΩ |
| 154 | pyridinium-F · pyridine · B$_2$F$_7^\ominus$ | Pt | Mg | 2 | Non | 1.8 V | 7.9 kΩ |
| 155 | (PhSO$_2$)$_2$NF | Pt | Zn | 0.5 | Non | 1.6 V | >1 MΩ |
| 156 | (PhSO$_2$)$_2$NF | Pt | Zn | 1 | Non | 1.5 V | >1 MΩ |
| 157 | (PhSO$_2$)$_2$NF | Pt | Zn | 2 | Non | 1.5 V | >1 MΩ |

TABLE 5-continued

| Example No. | Positive electrode (Compounds having a N—F bond) | Current collector | Negative electrode | Pressure (ton/cm$^2$) | Additive | Open circuit voltage | Internal resistance |
|---|---|---|---|---|---|---|---|
| 158 | (C$_6$H$_5$SO$_2$)$_2$N—F | Pt | Mg | 0.5 | Non | 2.5 V | >1 MΩ |
| 159 | (C$_6$H$_5$SO$_2$)$_2$N—F | Pt | Mg | 1 | Non | 2.3 V | >1 MΩ |
| 160 | (C$_6$H$_5$SO$_2$)$_2$N—F | Pt | Mg | 2 | Non | 2.4 V | >1 MΩ |
| 161 | CH$_3$—C$_6$H$_4$—SO$_2$—N(F)—CH$_3$ | Pt | Li | 1 | Non | 3.6 V | 252 kΩ |
| 162 | DABCO–CH$_2$Cl, N–F (⊖BF$_4$)$_2$ | Pt | Li | 1 | Sulfolane (9% by weight) | 3.9 V | >1 MΩ |
| 163 | DABCO–CH$_2$Cl, N–F (⊖BF$_4$)$_2$ | Pt | Li | 1 | Sulfolane (17% by weight) | 4.0 V | 31 kΩ |
| 164 | DABCO–CH$_2$Cl, N–F (⊖BF$_4$)$_2$ | Pt | Li | 1 | Non | 3.6 V | >1 MΩ |
| 165 | +(CH$_2$—CH)$_n$— (C$_6$H$_4$)N$^⊕$—F ⊖OSO$_2$CF$_3$ | Pt | Mg | 1 | Sulfolane (9% by weight) | 2.3 V | 97 kΩ |
| 166 | +(CH$_2$—CH)$_n$— (C$_6$H$_4$)N$^⊕$—F ⊖OSO$_2$CF$_3$ | Pt | Li | 1 | Non | 3.1 V | >1 MΩ |
| 167 | +(CH$_2$—CH)$_n$— (C$_6$H$_4$)N$^⊕$—F ⊖OSO$_2$CF$_3$ | Pt | Li | 1 | Sulfolane (9% by weight) | 3.8 V | >1 MΩ |

TABLE 5-continued

| Example No. | Positive electrode (Compounds having a N—F bond) | Current collector | Negative electrode | Pressure (ton/cm$^2$) | Additive | Open circuit voltage | Internal resistance |
|---|---|---|---|---|---|---|---|
| 168 | +CH$_2$—CH$)_n$ with phenyl-N$^{\oplus}$—F, $^{\ominus}$OSO$_2$CF$_3$ | Pt | Li | 1 | Sulfolane (19% by weight) | 3.0 V | 51 kΩ |
| 169 | +CH$_2$—CH$)_n$ with phenyl-N$^{\oplus}$—F, $^{\ominus}$OSO$_2$CF$_3$ | Pt | Li | 1 | Sulfolane (23% by weight) | 2.9 V | 20 kΩ |
| 170 | +CH$_2$—CH$)_n$ with phenyl-N$^{\oplus}$—F, $^{\ominus}$OSO$_2$CF$_3$ | Pt | Li | 1 | Sulfolane (36% by weight) | 3.1 V | 18 kΩ |

EXAMPLES 171 to 188

<Manufacture of batteries using compounds having a N—F bond—No. 3>

This method is to manufacture film-like batteries using the polymerized compounds having a N—F bond.

Figure 5:
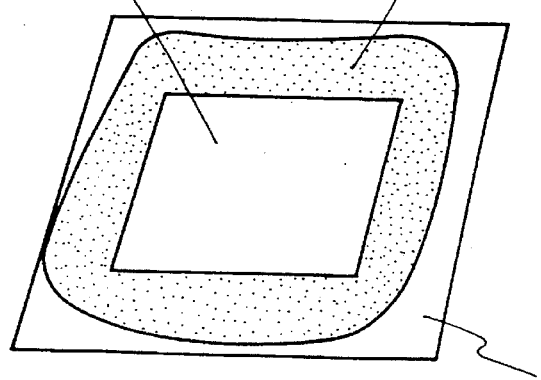
FIG. 5 is a perspective view of a battery manufactured in Examples 171 to 188.

In the present experiments, the same compounds having a N—F bond as those in Examples 165 to 170 were used. The compounds having a N—F bond were dissolved in the dehydrated acetonitrile, 1,1,1,3,3,3-hexafluoro-2-propanol or a mixture thereof. In case of the additives shown in Table 6, they were added into the above-mentioned solution at the given ratio. Thus obtained solution was dripped over the platinum plate, and then was fully dried at 100° C. for one hour in natural atmosphere. The ratio of the additives contained in the obtained film is shown in Table 6. After the thickness of the completed film was measured, a 1 cm×1 cm zinc or magnesium plate of the negative electrode was put on the film, and the open circuit voltage and the internal resistance were measured in the same manner as in Examples 18 to 170. Assembling and measuring of the batteries were carried out in natural atmosphere. FIG. 5 is a perspective view of the obtained batteries. The results are shown in Table 6.

TABLE 6

| Ex. No. | Current collector | Negative electrode | Additives | Film thickness (μm) | Open circuit voltage (V) | Internal resistance (kΩ) |
|---|---|---|---|---|---|---|
| 171 | Pt | Zn | Nothing | 10 | 1.5 | 350 |
| 172 | Pt | Zn | Nothing | 30 | 1.2 | 260 |
| 173 | Pt | Zn | Nothing | 63 | 0.8 | 47 |
| 174 | Pt | Zn | NaOSO$_2$CF$_3$ (5% by weight) | 30 | 1.3 | 138 |
| 175 | Pt | Zn | NaOSO$_2$CF$_3$ (5% by weight) | 35 | 1.1 | 52 |
| 176 | Pt | Zn | NaOSO$_2$CF$_3$ (5% by weight) | 100 | 1.1 | 20 |
| 177 | Pt | Zn | LiOSO$_2$CF$_3$ (5% by weight) | 10 | 1.5 | 133 |
| 178 | Pt | Zn | LiOSO$_2$CF$_3$ (5% by weight) | 20 | 1.4 | 126 |
| 179 | Pt | Zn | LiOSO$_2$CF$_3$ (5% by weight) | 30 | 1.2 | 73 |
| 180 | Pt | Zn | LiOSO$_2$CF$_3$ (5% by weight) | 85 | 1.2 | 61 |
| 181 | Pt | Zn | LiOSO$_2$CF$_3$ (1% by weight) | 120 | 1.2 | 24 |
| 182 | Pt | Zn | LiOSO$_2$CF$_3$ (5% by weight) | 30 | 1.4 | 135 |
| 183 | Pt | Zn | Zn(OSO$_2$CF$_3$)$_2$ (5% by weight) | 30 | 1.3 | 83 |
| 184 | Pt | Zn | Zn(OSO$_2$CF$_3$)$_2$ (5% by weight) | 63 | 1.2 | 66 |
| 185 | Pt | Zn | NH$_4$OSO$_2$CF$_3$ (50% by weight) | 30 | 1.0 | 7 |
| 186 | Ni | Zn | Nothing | 168 | 0.8 | 48 |
| 187 | Pt | Mg | Zn(OSO$_2$CF$_3$)$_2$ (5% by weight) | 10 | 0.6 | 47 |
| 188 | Pt | Mg | Mg(OSO$_2$CF$_3$)$_2$ (5% by weight) | 10 | 1.4 | 13 |

EXAMPLE 189

<Manufacture of batteries using the compounds having a N—F bond—No. 4>

This method is to manufacture thick batteries. In the air, as shown in Table 7, additives were mixed enough in a mortar at the given ratio with 1.5 g of the compounds having a N—F bond.

A pressure type pelletizing equipment of stainless steel which was connected to a vacuum pump was charged with the obtained mixture and then pressed for 10 minutes by the pressure (ton/cm$^2$) shown in Table 7 with a press under a suction by the vacuum pump. Thus a 6.25 mm thick by 13 mm diameter pellet of a cylindrical form was prepared. The pellet was put between the current collector and the negative electrode both shown in Table 7 and assembled into the battery as shown in FIG. 2. The open circuit voltage was measured, and the internal resistance was obtained in the same manner as in Examples 18 to 170. Assembling of the battery and measuring were carried out in an argon gas atmosphere. The results are shown in Table 7.

TABLE 7

| Example No. | Positive electrode (Compounds having a N—F bond) | Current collector | Negative electrode | Pressure (ton/cm$^2$) | Additive | Open circuit voltage | Internal resistance |
|---|---|---|---|---|---|---|---|
| 189 | 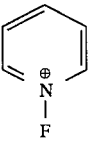 | Pt | Li | 1 | Sulfolane (9% by weight) | 3.9 V | 110 kΩ |

EXAMPLES 190 to 205

<Manufacture of batteries using the compounds having a N—F bond—No. 2>

The batteries were manufactured in the same manner as in Examples 18 to 170 except that about 200 mg of the compounds having a N—F bond and a 2 cm×2 cm platinum as the current collector at the positive electrode side were used. Only in case of Example 194, about 100 mg of the compound having a N—F bond was used.

TABLE 8

| Example No. | Positive electrode (Compounds having a N—F bond) | Current collector | Negative electrode | Pressure (ton/cm$^2$) | Additive | Open circuit voltage | Internal resistance |
|---|---|---|---|---|---|---|---|
| 190 | 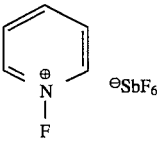 | Pt | Li | 1 | Sulfolane (9% by weight) | 3.7 V | 7.5 kΩ |
| 191 | 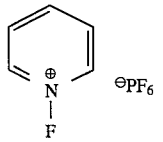 | Pt | Li | 1 | Sulfolane (9% by weight) | 3.6 V | 9.1 kΩ |
| 192 | 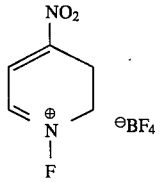 | Pt | Li | 1 | Non | 3.9 V | 42 kΩ |
| 193 | 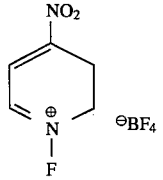 | Pt | Li | 1 | Sulfolane (9% by weight) | 3.8 V | 4.1 kΩ |

TABLE 8-continued

| Example No. | Positive electrode (Compounds having a N—F bond) | Current collector | Negative electrode | Pressure (ton/cm²) | Additive | Open circuit voltage | Internal resistance |
|---|---|---|---|---|---|---|---|
| 194 | 4-CH₃-pyridinium-N-F, ⁻BF₄ | Pt | Li | 1 | Non | 3.7 V | >1 MΩ |
| 195 | 2,6-bis(COOCH₃)-pyridinium-N-F, ⁻OSO₂CF₃ | Pt | Li | 1 | Non | 4.0 V | 41 kΩ |
| 196 | 2,6-bis(COOCH₃)-pyridinium-N-F, ⁻OSO₂CF₃ | Pt | Li | 1 | Sulfolane (9% by weight) | 4.0 V | 27 kΩ |
| 197 | 2-(menthyloxy)-pyridinium-N-F, ⁻OSO₂CF₃ | Pt | Li | 1 | Sulfolane (9% by weight) | 3.8 V | 32 kΩ |
| 198 | 6-Cl-2-SO₃⁻-pyridinium-N-F | Pt | Li | 1 | Sulfolane (9% by weight) | 3.2 V | 36.5 kΩ |
| 199 | octahydroacridinium-N-F, ⁻OSO₂CF₃ | Pt | Li | 1 | Sulfolane (9% by weight) | 3.5 V | 15.5 kΩ |
| 200 | quinolinium-N-F, ⁻OSO₂CF₃ | Pt | Li | 1 | Non | 4.0 V | >1 MΩ |
| 201 | quinolinium-N-F, ⁻OSO₂CF₃ | Pt | Li | 1 | Sulfolane (9% by weight) | 3.7 V | 9.7 kΩ |
| 202 | 4-CH₃-2-SO₃⁻-quinolinium-N-F | Pt | Li | 1 | Non | 3.7 V | >1 MΩ |

TABLE 8-continued

| Example No. | Positive electrode (Compounds having a N—F bond) | Current collector | Negative electrode | Pressure (ton/cm$^2$) | Additive | Open circuit voltage | Internal resistance |
|---|---|---|---|---|---|---|---|
| 203 | 4-methyl-N-fluoroquinolinium-2-sulfonate (zwitterion with CH$_3$, N$^\oplus$–F, SO$_3^\ominus$) | Pt | Li | 1 | Sulfolane (9% by weight) | 3.7 V | 94 kΩ |
| 204 | bis(N-fluoropyridinium) · B$_2$F$_7^\ominus$ | Pt | Li | 1 | Non | 3.7 V | >1 MΩ |
| 205 | bis(N-fluoropyridinium) · B$_2$F$_7^\ominus$ | Pt | Li | 1 | Sulfolane (9% by weight) | 3.5 V | 5.5 kΩ |

In the process of the present invention for generating an energy such as electricity, the compounds having a N—F bond are used, which assures easy handling and excellent environmental acceptability. By properly selecting the compounds having a N—F bond, a high electromotive force or the desired electromotive force can be obtained, and furthermore the batteries having a high energy density, wide usable temperature range and long life time can be obtained.

Also in case where the above-mentioned compound having a high melting point is used as the materials for the positive electrode of the battery and the positive electrode is so designed as to contact direct to the negative electrode, it is possible to achieve small size and light weight with a simple structure.

INDUSTRIAL APPLICABILITY

A novel process of the present invention for generating electric energy, a device therefor and a compound having a N—F bond for generating electric energy assures easy handling and excellent environmental acceptability, are capable of giving a high electromotive force and the desired voltage, and can be used for an liquid electrolytic battery and a paper type battery.

We claim:

1. A process for generating electricity by electrochemical reaction between a compound having a N—F bond and a compound giving electrons to the compound.

2. The process for generating electricity of claim 1, wherein the compound having a N—F bond is brought into contact directly with the compound giving the electron.

3. The process for generating electricity of claim 1, wherein a compound having a N—F bond is a compound which generates an electromotive force of not less than 3 V as electric energy by the electrochemical reaction.

4. The process for generating electricity of claim 1, wherein polar compounds are further added into the compound having a N—F bond.

5. The process of claim 1, wherein a means for the generating the electricity is a battery.

6. The process of claim 1, wherein the compound having a N—F bond can generate electricity.

7. The process of claim 1, wherein the compound having a N—F bond is at least one compound selecting from the group consisting of N-fluoropyridinium compound, N-fluorosulfonamide compound, N-fluoroquinuclidinium compound, N-fluoro-1,4-diazoniabicyclo[2.2.2]octane compound, N-fluorodisulfonimide compound, N-fluoroamide compound, N-fluorocarbamate compound and N-fluoropyridone compound.

8. An energy generating device for supplying electricity to an article utilizing the energy in combination use of a compound having a N—F bond and a compound giving electrons to said compound.

9. The energy generating device of claim 8, wherein the compound having a N—F bond and the compound giving the electrons are brought into contact directly with each other.

10. The energy generating device of claim 8 for supplying electricity to the article utilizing the energy, wherein compound having a N—F bond generates an electromotive force of not less than 3 V as an electric energy in the combination use.

11. The energy generating device of claim 8, wherein polar compounds are further added into the compound having a N—F bond.

12. The energy generating device of claim 8, wherein the energy generating device is a battery.

13. The energy generating device of claim 8, wherein the compound having a N—F bond can generate electricity.

14. The energy generating device of claim 8, wherein the compound having a N—F bond is at least one compound selecting from the group consisting of N-fluoropyridinium compound, N-fluorosulfonamide compound, N-fluoroquinuclidinium compound, N-fluoro-1,4-diazoniabicyclo[2.2.2]octane compound, N-fluorodisulfonimide compound, N-fluoroamide compound, N-fluorocarbamate compound and N-fluoropyridone compound.

15. The active material of claim 14, wherein the compound having a N—F bond can generate electricity.

16. A liquid electrolytic battery comprising a positive electrode, a negative electrode and an electrolytic solution wherein an active material for the positive electrode is a compound having a N—F bond.

17. The liquid electrolytic battery of claim 16, wherein electroconductive materials are further added into the compound having a N—F bond as the active material for the positive electrode.

18. The liquid electrolytic battery of claim 16, wherein polar compounds are further added into the compound having a N—F bond.

19. The liquid electrolytic battery of claim 16, wherein the compound having a N—F bond can generate electricity.

20. The liquid electrolytic battery of claim 16, wherein the compound having a N—F bond is at least one compound selecting from the group consisting of N-fluoropyridinium compound, N-fluorosulfonamide compound, N-fluoroquinuclidinium compound, N-fluoro-1,4-diazoniabicyclo[2.2.2]octane compound, N-fluorodisulfonimide compound, N-fluoroamide compound, N-fluorocarbamate compound and N-fluoropyridone compound.

21. A thin battery comprising a negative electrode with an active material and with a current collector, and a positive electrode with an active material and with a current collector, wherein the active material for the positive electrode in the form of a film is a compound which has a N—F bond and is arranged between the negative electrode and the current collector for the positive electrode.

22. The thin battery of claim 21, consisting essentially of three-layer structure of the current collector for the positive electrode, the active material for the positive electrode in the form of a film, and the negative electrode.

23. The thin battery of claim 21, wherein there is used a positive electrode made by coating the current collector for the positive electrode with the compound having a N—F bond.

24. The thin battery of claim 21, wherein the compound having a N—F bond can generate electricity.

25. The thin battery of claim 21, wherein the compound having a N—F bond is at least one compound selecting from the group consisting of N-fluoropyridinium compound, N-fluorosulfonamide compound, N-fluoroquinuclidinium compound, N-fluoro-1,4-diazoniabicyclo[2.2.2]octane compound, N-fluorodisulfonimide compound, N-fluoroamide compound, N-fluorocarbamate compound and N-fluoropyridone compound.

26. An active material for positive electrode comprising a compound having a N—F bond for generating energy, which generates electricity by electrochemical reaction caused by receiving electrons from a compound giving the electrons.

27. The active material of claim 26, wherein the compound having a N—F bond comprises at least nitrogen atom, carbon atom and fluorine atom.

28. The active material of claim 26, wherein the compound having a N—F bond comprises at least nitrogen atom, carbon atom and fluorine atom and has an ionic bond.

29. The active material of claim 26, wherein the compound having a N—F bond comprises nitrogen atom, carbon atom, fluorine atom and one or more of atoms different therefrom.

30. The active material of claim 29, wherein the one or more of atoms different from nitrogen atom, carbon atom and fluorine atom are H, B, O, Al, Si, P, S, Cl, As, Br, Sb or I.

31. The active material of claim 26, wherein the compound having a N—F bond generates an electromotive force of not less than 3 V as electric energy by an electrochemical reaction.

32. The active material of claim 26, wherein one or more of polar compounds are further added into the said compound having a N—F bond.

33. The active material of claim 26, wherein the compound having a N—F bond is at least one compound selecting from the group consisting of N-fluoropyridinium compound, N-fluorosulfonamide compound, N-fluoroquinuclidinium compound, N-fluoro-1,4-diazoniabicyclo[2.2.2]octane compound, N-fluorodisulfonimide compound, N-fluoroamide compound, N-fluorocarbamate compound and N-fluoropyridone compound.

* * * * *